(12) United States Patent
Cheung et al.

(10) Patent No.: US 6,983,280 B2
(45) Date of Patent: Jan. 3, 2006

(54) AUTOMATED PROCESSING OF APPROPRIATENESS DETERMINATION OF CONTENT FOR SEARCH LISTINGS IN WIDE AREA NETWORK SEARCHES

(75) Inventors: Dominic Cheung, South Pasadena, CA (US); Dennis Wu, Foster City, CA (US); Barry Laffoon, Glendale, CA (US); Alan Lang, Redondo Beach, CA (US); Scott Snell, Hollywood, CA (US); Jie Zhang, Saugus, CA (US); Pierre Wang, Beverly Hills, CA (US); Jennifer Wu, Los Angeles, CA (US); Peter Goodwine, Altadena, CA (US); Wai-Yin Wong, La Crescenta, CA (US); Carey Sublette, Rancho Cucamonga, CA (US); Stephan Cunningham, Burbank, CA (US); Bruce T. Holmes, Pasadena, CA (US)

(73) Assignee: Overture Services Inc., Pasadena, CA (US)

( * ) Notice: Subject to any disclaimer, the term of this patent is extended or adjusted under 35 U.S.C. 154(b) by 578 days.

(21) Appl. No.: 10/244,051

(22) Filed: Sep. 13, 2002

(65) Prior Publication Data

US 2004/0054661 A1 Mar. 18, 2004

(51) Int. Cl.
*G06F 17/30* (2006.01)
(52) U.S. Cl. ................. 707/10; 707/3; 707/6; 709/203; 715/513
(58) Field of Classification Search .................. 707/1, 707/3–5, 10, 6; 709/303; 704/4, 6, 9; 715/501.1, 715/513
See application file for complete search history.

(56) References Cited

U.S. PATENT DOCUMENTS

| | | | |
|---|---|---|---|
| 6,065,056 A * | 5/2000 | Bradshaw et al. | 709/229 |
| 6,269,361 B1 | 7/2001 | Davis et al. | 707/3 |
| 6,377,945 B1 * | 4/2002 | Risvik | 707/3 |
| 6,424,358 B1 * | 7/2002 | DiDomizio et al. | 715/762 |
| 6,493,744 B1 * | 12/2002 | Emens et al. | 709/203 |
| 6,526,402 B2 * | 2/2003 | Ling | 707/3 |
| 6,775,664 B2 * | 8/2004 | Lang et al. | 707/3 |
| 6,829,599 B2 * | 12/2004 | Chidlovskii | 707/3 |
| 6,850,934 B2 * | 2/2005 | Bates et al. | 707/5 |
| 2002/0059221 A1 | 5/2002 | Whitehead et al. | 707/5 |

OTHER PUBLICATIONS

"Tolerant Database Import Utility" IBM Technical Disclosure Bulletin, vol. 31 No. 11, Apr. 1989, p. 31.

* cited by examiner

*Primary Examiner*—Greta Robinson
*Assistant Examiner*—Cheryl Lewis
(74) *Attorney, Agent, or Firm*—James D. Ivey; Ivey, Smith & Ramirez

(57) ABSTRACT

A method and system for improving the efficiency of a database processing system for evaluating candidate data items representing search listings that are submitted for inclusion into a search engine database. Candidate search listings are automatically assessed for quality, style, and relevance to evaluate risk of unfavorable reception by a user and of potential exposure volume. Search listings which are higher-risk or higher-volume are routed through manual editorial review while lower-risk, lower-volume search listings are routed for immediate inclusion in the search database without manual editorial evaluation. Accordingly, human editorial efforts can be devoted to manual review of high-risk or high-volume search listings while efficiency is simultaneously improved in the processing system as a whole.

81 Claims, 11 Drawing Sheets

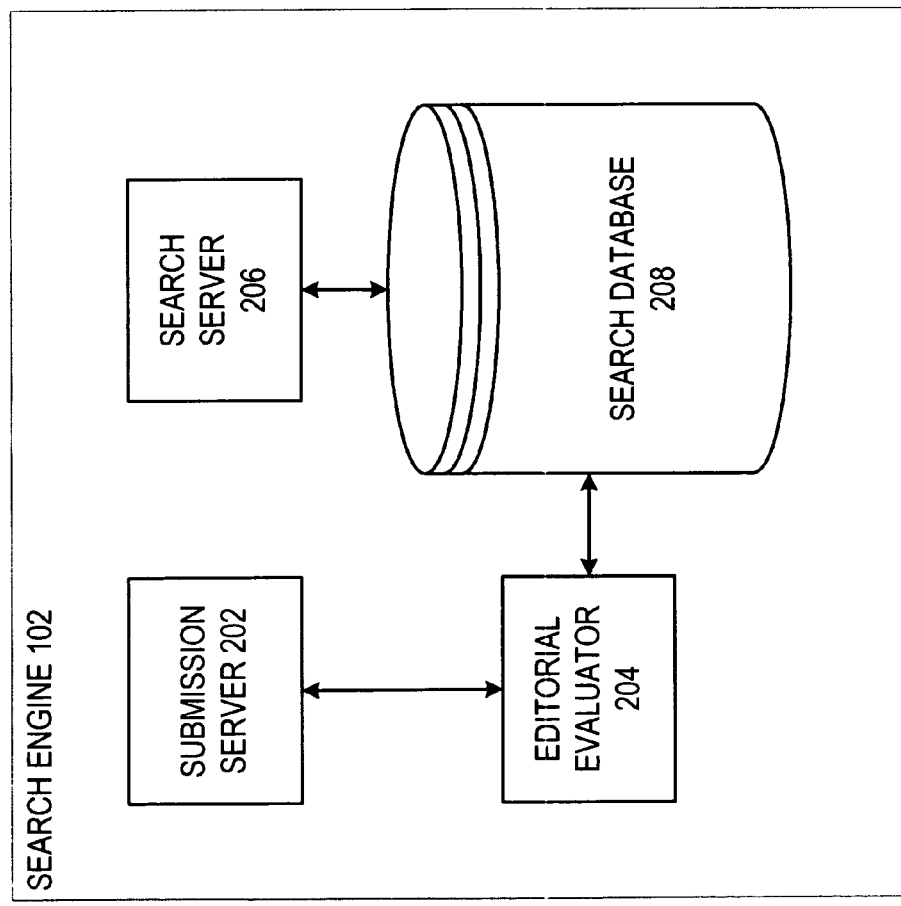

AUTOMATED PROCESSING OF APPROPRIATENESS DETERMINATION OF CONTENT FOR SEARCH LISTINGS IN WIDE AREA NETWORK SEARCHES

FIELD OF THE INVENTION

This invention relates to the field of automated document content analysis, and more specifically to a mechanism for automated determination of the appropriateness of a search listing for inclusion in a wide area network search engine database.

BACKGROUND OF THE INVENTION

The Internet is a wide area network having a truly global reach, interconnecting computers all over the world. That portion of the Internet generally known as the World Wide Web is a collection of inter-related data whose magnitude is truly staggering. The content of the World Wide Web (sometimes referred to as "the Web") includes, among other things, documents of the known HTML (Hyper-Text Markup Language) format which are transported through the Internet according to the known protocol, HTTP (Hyper-Text Transport Protocol).

The breadth and depth of the content of the Web is amazing and overwhelming to anyone hoping to find specific information therein. Accordingly, an extremely important component of the Web is a search engine. As used herein, a search engine is an interactive system for locating content relevant to one or more user-specified search terms, which collectively represent a search query. Through the known Common Gateway Interface (CGI), the Web can include content which is interactive, i.e., which is responsive to data specified by a human user of a computer connected to the Web. A search engine receives a search query of one or more search terms from the user and presents to the user a list of one or more documents which are determined to be relevant to the search query.

Search engines dramatically improve the efficiency with which users can locate desired information on the Web. As a result, search engines are one of the most commonly used resources of the Internet. An effective search engine can help a user locate very specific information within the billions of documents currently represented within the Web. The critical function and raison d'être of search engines is to identify the few most relevant results among the billions of available documents given a few search terms of a user's query and to do so in as little time as possible. Thus, a critical function of search engines is determination of relevance of documents to a search query.

Generally, search engines maintain a database of records associating search terms with information resources on the Web. Search engines currently acquire information about the contents of the Web primarily in several common ways. The most common is generally known as crawling the Web and the second is by submission of such information by a provider of such information or by third-parties (i.e., neither a provider of the information nor the provider of the search engine). Another common way for search engines to acquire information about the content of the Web is for human editors to create indices of information based on their review.

To understand crawling, one must first understand that documents of the Web can include references, commonly referred to as links, to other documents of the Web. Anyone who has "clicked on" a portion of a document to cause display of a referenced document has activated such a link. Crawling the Web generally refers to an automated process by which documents referenced by one document are retrieved and analyzed and documents referred to by those documents are retrieved and analyzed and the retrieval and analysis are repeated recursively. Thus, an attempt is made to automatically traverse the entirety of the Web to catalog the entirety of the contents of the Web.

Due to the fact that documents of the Web are constantly being added and/or modified and also to the sheer immensity of the Web, no Web crawler has successfully cataloged the entirety of the Web. Accordingly, providers of Web content who wish to have their content included in search engine databases directly submit their content to providers of search engines. Other providers of content and/or services available through the Internet contract with operators of search engines to have their content regularly crawled and updated such that search results include current information. Some search engines, such as the search engine provided by Overture Services, Inc. of Pasadena, Calif. (http://www.overture.com) and described in U.S. Pat. No. 6,269,361 which is incorporated herein by reference, allow providers of Internet content and/or services to compose and submit brief titles and descriptions to be associated with their content and/or services in results as a search query. As the Internet has grown and commercial activity has also grown over the Internet, some search engines have specialized in providing commercial search results presented separately from informational results with the added benefit of facilitating commercial transactions over the Internet. One such search engine is the search engine described in the '361 Patent and provided by Overture Services, Inc. as described above.

Since search engines which provide unwanted information are at a distinct disadvantage to search engines which minimize presentation of unwanted information, search engine providers have a strong interest in maximizing relevance of results provided to search queries. Providers of search engines therefore often review the content of individual search listings for desirability and appropriateness prior to including each listing in their database for real-time delivery of search results in response to a search query.

Due to the overwhelming amount of information on the Web, such review is a daunting task. In addition, content review generally has not lent itself to automation since the appropriateness of a particular search listing depends upon subtleties of human perception of both the search listing itself and the content referenced by the search listing. Operators of search engines have general had to choose between (i) automatically generating search results of listings having questionable relevance and therefore less value to the user or (ii) manually generating more relevant search listings by human editing but on a drastically reduced scale. While manually edited search listings tend to be far more relevant and therefore far more effective in attracting users to a search engine, manual editing of search listings is very expensive in both time and resources and significantly delays availability of newly submitted search listings to users of the search engine. Delayed availability of search listings reduces the currency of search listings produced as results in response to search queries.

What is needed is a mechanism by which review of one or more search listings can be efficiently performed while maintaining accurate analysis of the impression of a given search listing on a human user seeing the search listing and/or the content referenced by the search listing.

SUMMARY OF THE INVENTION

In accordance with the present invention, candidate search listings are automatically evaluated to determine the likelihood that the search listings comport with a content policy. Specifically, candidate search listings that are determined to be lower-risk and lower-volume search listings can be automatically and quickly approved for inclusion in the search listing database for immediate serving as results in response to a real-time query by a user. Parties submitting candidate search listings for inclusion in a search engine database benefit from quick approval and availability of submitted search listings. In addition, such parties can be automatically notified of automated approval or rejection of submitted listings, providing greater satisfaction and promoting confidence in the efficiency and effectiveness of the candidate search listing evaluation process.

Another benefit of quickly and automatically approving lower-risk, lower-volume candidate search listings for inclusion in a search listing database is that valuable human resources can be dedicated to more careful editorial review of candidate search listings which are automatically determined to be either not lower-risk or not lower-volume search listings. Thus, quality of the editorial review of candidate search listings increases while efficiency of editorial review of all candidate search listings simultaneously increases.

The automated preprocessing to assess likelihood that a candidate search listing comports with the predetermined content policy includes generally quality, style, and relevance analysis. Quality analysis assesses the nature of the content and, specifically, the likelihood and degree to which the content of the candidate search listing is objectionable. Some types of content are so objectionable as to be unilaterally prohibited by a search engine provider, and so the detection of such blocked content in a candidate search listing results in the automatic rejection of the listing and notification of the submitting source of such rejection and the reasons for the rejection. Suspect terms are terms which indicate that a more thorough review of the candidate search listing is warranted. Detection of suspect content in the search listing causes the search listing to be routed for manual review of the search listing to determine whether the search listing comports with the content policy and notification of the submitter that such manual review is being undertaken. Likewise, sexual and gambling content in a search listing does not automatically flag the search listing for rejection but does flag the search listing for a more thorough, manual review by the human editor. Nonsensical, junk text within a search listing however does cause the search listing to be automatically rejected and the submitter notified.

In automated evaluation of the style of a candidate search listing, generally three actions are possible. It should be noted that the three actions are not mutually exclusive. First, the candidate search listing can be marked for rejection and automatically sent back to the submitting source with an indication of the reasons for the rejection. Second, the candidate search listing can be flagged for manual review and routed to a human editor with notification of same to the submitter. Third, the candidate search listing can be automatically modified to comport with the predetermined style policy and once edited automatically included in the database. The style policy can specify various style criteria which must be met by a search listing to be included in the search engine database, including rules on capitalization of characters, rules on punctuation, prohibitions of contact information in the search listing, prohibitions against superlatives, and similar criteria as illustrative examples.

In the automated relevance determination of a candidate search listing, the relevance of a submitted listing to a search term is determined by algorithmically screening the content of an assocaited web page to verify a set of relevance criteria. Relevance criteria include such things as (i) whether the associated URL address refer to an existing document, (ii) whether the referenced document contains the associated search term, and (iii) whether the search term, title, and description of the search listing are relevant to the referenced document. Such relevance criteria are only representative and could include any criteria deemed appropriate to a relevance determination. Like the evaluation of style, generally three actions are possible from an automated relevance determination. First the search listing can be definitively considered relevant to the search term and thus approved for automatic processing. Second, the search listing can be determined marginally relevant to the search term and thus routed for manual review by a human editor. Third, the search listing can be determined to be decidedly not relevant to the search and automatically rejected.

BRIEF DESCRIPTION OF THE DRAWINGS

FIG. 2 is a block diagram of the search engine of FIG. 1 in greater detail.

FIG. 3 is a block diagram of a search listing to be considered for inclusion in a search database in accordance with the present invention.

FIGS. 8A and 8B collectively form FIG. 8 as shown;

FIGS. 9A and 9B collectively form FIG. 9 as shown.

DETAILED DESCRIPTION

In accordance with the present invention, editorial review of lower-risk candidate search listings involving relatively lower-volume search terms is automated to allow human editors to focus more attention on candidate search listings involving higher-volume search terms and therefore involving higher risk of unfavorable exposure and/or of cluttering search results with marginally relevant search listings. Accordingly, the average time required to evaluate a submitted search listing is greatly reduced and many lower-volume, lower-risk search listings can be approved almost immediately, thus increasing the efficiency and profitability of a search engine provider.

Figure 1:
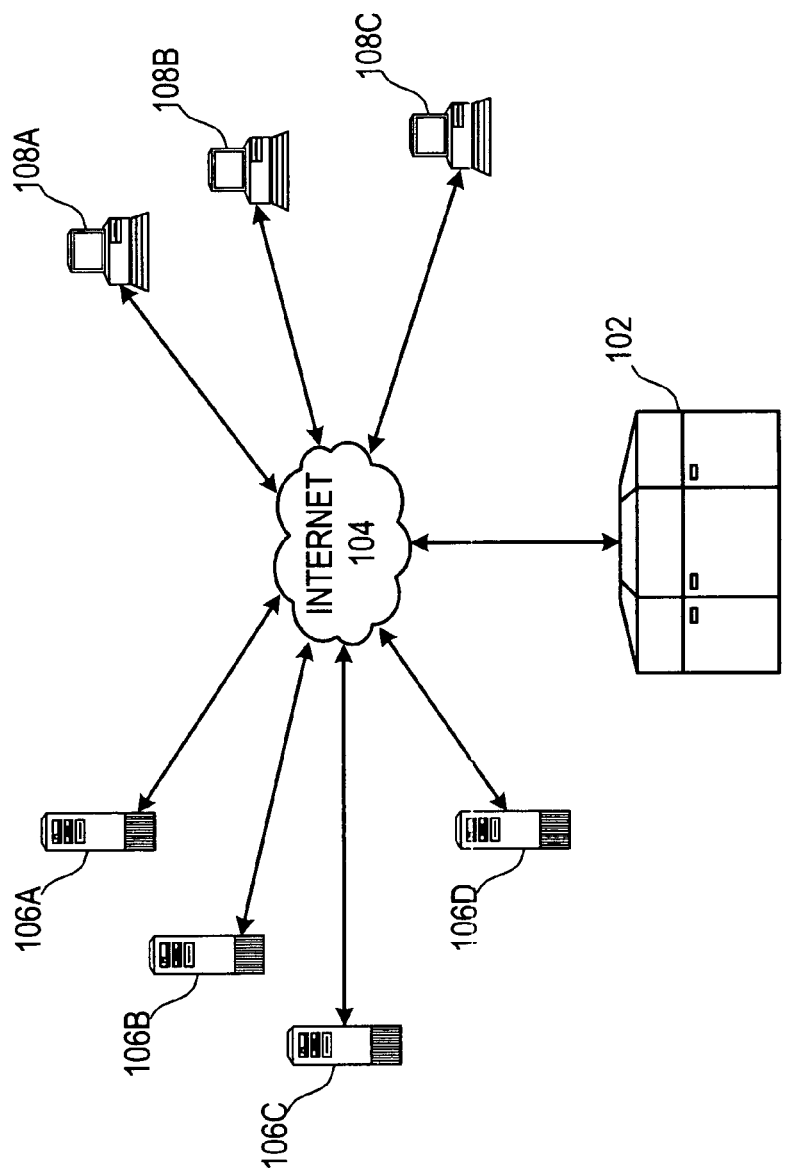
FIG. 1 is a block diagram illustrating a wide area network, such as the Internet, in which a search engine according to the present invention is deployed.

Greatly simplified for illustration purposes, FIG. 1 shows a search engine 102 which is coupled to, and serves, a wide area network 104 which is the Internet in this illustrative embodiment. A number of host computer systems 106A–D are coupled to Internet 104 and provide content to a number of client computer systems 108A–C. For example, while only four (4) host computer systems and three (3) client computer systems are shown, it should be appreciated that (i) host computer systems and client computer systems coupled to the Internet collectively number in the millions of computer systems and (ii) host computer systems can retrieve information like a client computer system and client computer systems can host information like a host computer system.

Search engine 102 is a computer system which catalogs information hosted by host computer systems 106A–D and serves search requests of client computer systems 108A–C for information which may be hosted by any of host computers 106A–D. In response to such requests, search engine 102 produces a result set of any cataloged information which matches one or more search terms specified in the search request. Such information, as hosted by host computer systems 106A–D, includes information in the form of what are commonly referred to as web sites. Such information can be retrieved through the known and widely used hypertext transport protocol (HTTP) in a portion of the Internet widely known as the World Wide Web. A single multimedia document presented to a user is generally referred to as a web page and inter-related web pages under the control of a single person, group, or organization is generally referred to as a web site.

While searching for pertinent web pages and web sites is described herein, it should be appreciated that some of the techniques described herein are equally applicable to search for information in other forms stored in a wide area network and accessible through other network protocols. In addition, editorial authority can be exercised by any person or organization hosting information submitted by another. For example, stringent quality controls can be implemented in a privately operated intranet or in any network, LAN or WAN, and not only in the Internet. Similarly, Internet Service Providers or providers of web hosting services can use the techniques described herein to enforce policies with respect to hosted content.

Search engine 102 is shown in greater detail in FIG. 2. Search engine 102 includes a search server 206 which receives and serves search requests from any of client computer systems 108A–C using a search database 208. Search engine 102 also includes a submission server 202 for receiving search listing submissions from any of host computers 108A–D. Each submission requests that information hosted by any of host computers 108A–D be cataloged within search database 208 and therefore available as search results through search server 206.

To avoid providing unwanted search results to client computer systems 108A–C, search engine 102 includes an editorial evaluator 204 which evaluates submitted search listings prior to inclusion of such search listings in search database 208. This function serves an important business requirement for any provider of a search engine by ensuring the satisfaction of legal and contractual content filtration and presentation obligations. Standardizing the presentation and format for search result listings can also increase the effectiveness of the overall presentation of search results and can aid search engine providers in the effort to generate more relevant results to users.

In this illustrative embodiment, search engine 102—and each of submission server 202, editorial evaluator 204, and search server 206—is all or part of one or more computer processes executing in one or more computers. Briefly, submission server 202 receives requests to list information within search database 208. Each such request includes one or more candidate search listing, generally of the form of search listing 300 (FIG. 3). It should be appreciated that search listing 300 is submitted to search engine 102 and is therefore originally created externally with respect to search engine 102. For convenience, the party submitting search listing 300 is sometimes referred to as the owner of search listing 300. However, it should be appreciated that the party submitting a search listing is not necessarily the creator of the referenced information.

Search listing 300 includes an account field 302 which identifies an entity on whose behalf the request is made. Account field 302 enables search engine 102 to limit search listing requests to a number of trusted entities and/or to charge fees for serving requests to include search listings in search database 208. In an alternative embodiment in which no fees are charged for serving such requests, account field 302 is omitted.

Term field 304 of search listing 300 specifies a particular search term to which search listing pertains. For example, a search term, "travel," can be associated with a search listing pertaining to travel information.

URL 306 of search listing 300 specifies an address within Internet 104 of the information associated with the term of term field 304. URL 306 is a Uniform Resource Locator (URL) and identifies a specific web page in this illustrative embodiment. URLs are well-known and are not described further herein. It is appreciated that a URI can also be used in URL 306. Generally, URL 306 is data identifying information, e.g., a document, which is available through Internet 104 and for which the user may be searching. Other known types of information references can be used in place of a URL.

Search listing 300 includes a description field 310 which includes a brief description of the information found at the address of URL 306. Description field 310 is used to provide the user a brief synopsis of the web page identified by URL 306 to thereby assist the user in determining the relevance of the web page to a requested search. It should be appreciated that description field 310 is supplied by the owner and, initially, is relevant to—and accurately descriptive of—the information referenced URL 306 only to the degree the owner of search listing 300 has made it so.

Category field 312 of search listing 312 specifies a category within which the search term of term field 304 belongs as determined by the owner of search listing 300. Such helps distinguish synonymous search terms. For example, the term "book" can be used to refer to a printed literary work, the placing of a bet at a horse race, or the making of a reservation, e.g., for a hotel or flight. Category field 312 can be used to distinguish each meaning of the term "book." In this illustrative embodiment, category field 312 is optional and therefore need not be specified in search listing 300.

In this illustrative embodiment, search listings of search database 208 are ordered according to bids for higher placement for specific search terms. In general, higher bids for a given search term are listed earlier within search results pertaining to the search term. Maximum bid field 314 and bid type field 316 specify, respectively, the maximum amount that the submitter of search listing 300 is willing to pay for top placement in a results list and the type of bid. In this illustrative embodiment, bids can be static or automatic with a maximum bid specified, but it should be appreciated that any form of bid, bid value, or bid plus other relevance consideration can be used to rank results to a user query. The types of bids represented in bid type field include fixed bids and automatically incremented bids in this illustrative embodiment. If the bid is fixed, maximum bid field 314 represents a fixed bid amount. If the bid is automatically incremented, maximum bid field 314 represents a maximum bid amount up to which, but not beyond, the bid can be automatically incremented.

In this illustrative embodiment, manual editorial evaluation of search listing 300 can be requested by the entity submitting search listing 300. Such a request prevents automated editorial evaluation in the manner described here and is represented in manual evaluation request flag 318.

Search listings are organized and evaluated in the context of a marketplace in this illustrative embodiment. Thus, the objectionable quality of any portion of search listing 300 can be evaluated in the context of the marketplace for which search listing 300 is intended. That marketplace is indicated within marketplace field 320. Alternatively, marketplace field 320 can specify one or more marketplaces to which search listing 300 is applicable. In this illustrative embodiment, valid marketplaces include the United States, the United Kingdom, Germany, France, and Japan.

Figure 4:
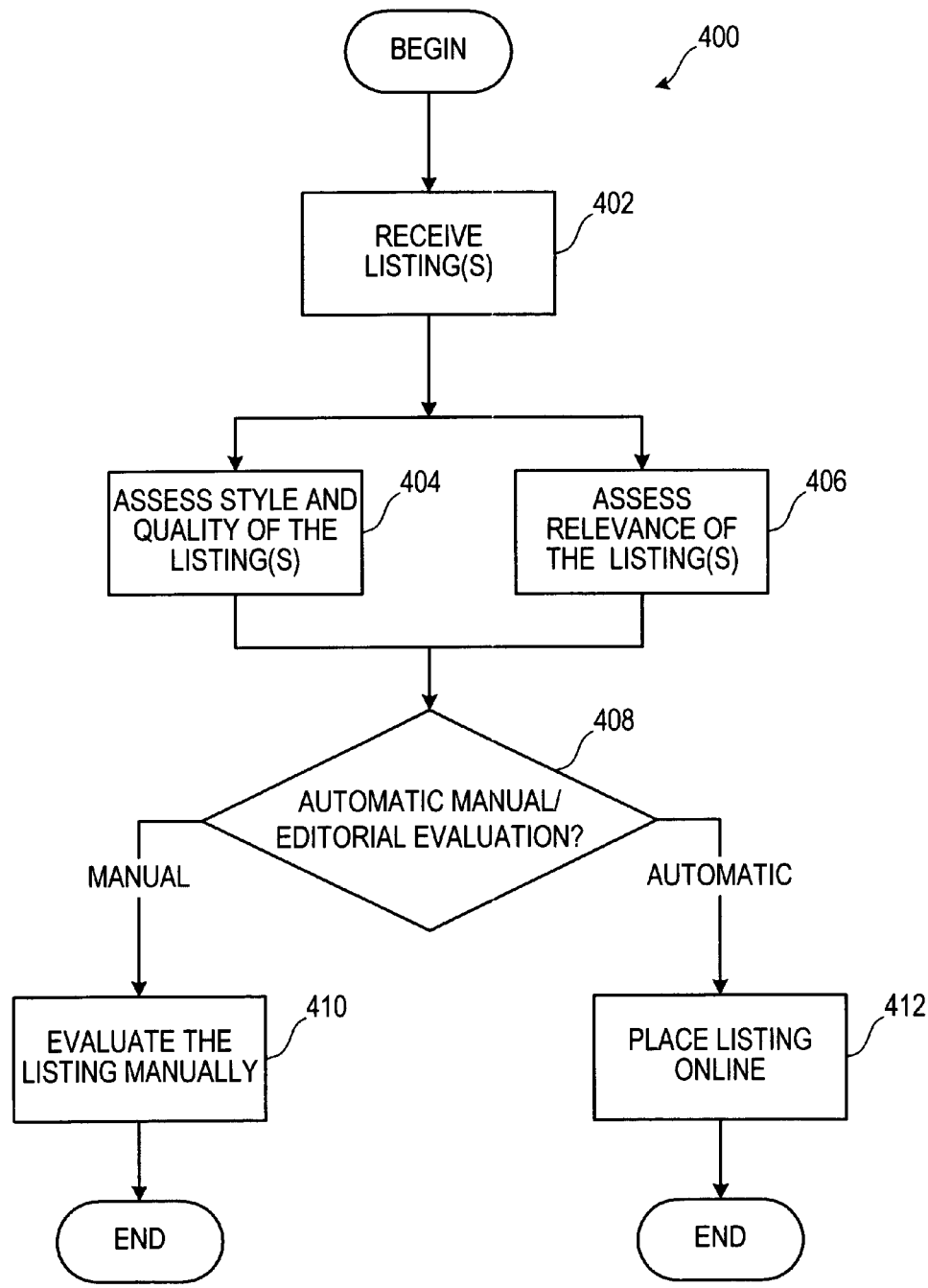
FIG. 4 is a logic flow diagram of the evaluation of candidate search listings in accordance with the present invention.

Submission server 202 receives one or more search listings and forwards them to editorial evaluator 204 which determines the appropriateness of including each search listing in search database 208. Processing by editorial evaluator 204 in making such a determination is illustrated by logic flow diagram 400 (FIG. 4).

In step 402, editorial evaluator 204 receives search listing 300 (FIG. 3). Logic flow diagram 400 (FIG. 4) shows processing of a single search listing. If multiple search listings are received, each is processed according to logic flow diagram 400 independently of, and concurrently with, other search listings.

Figure 5:
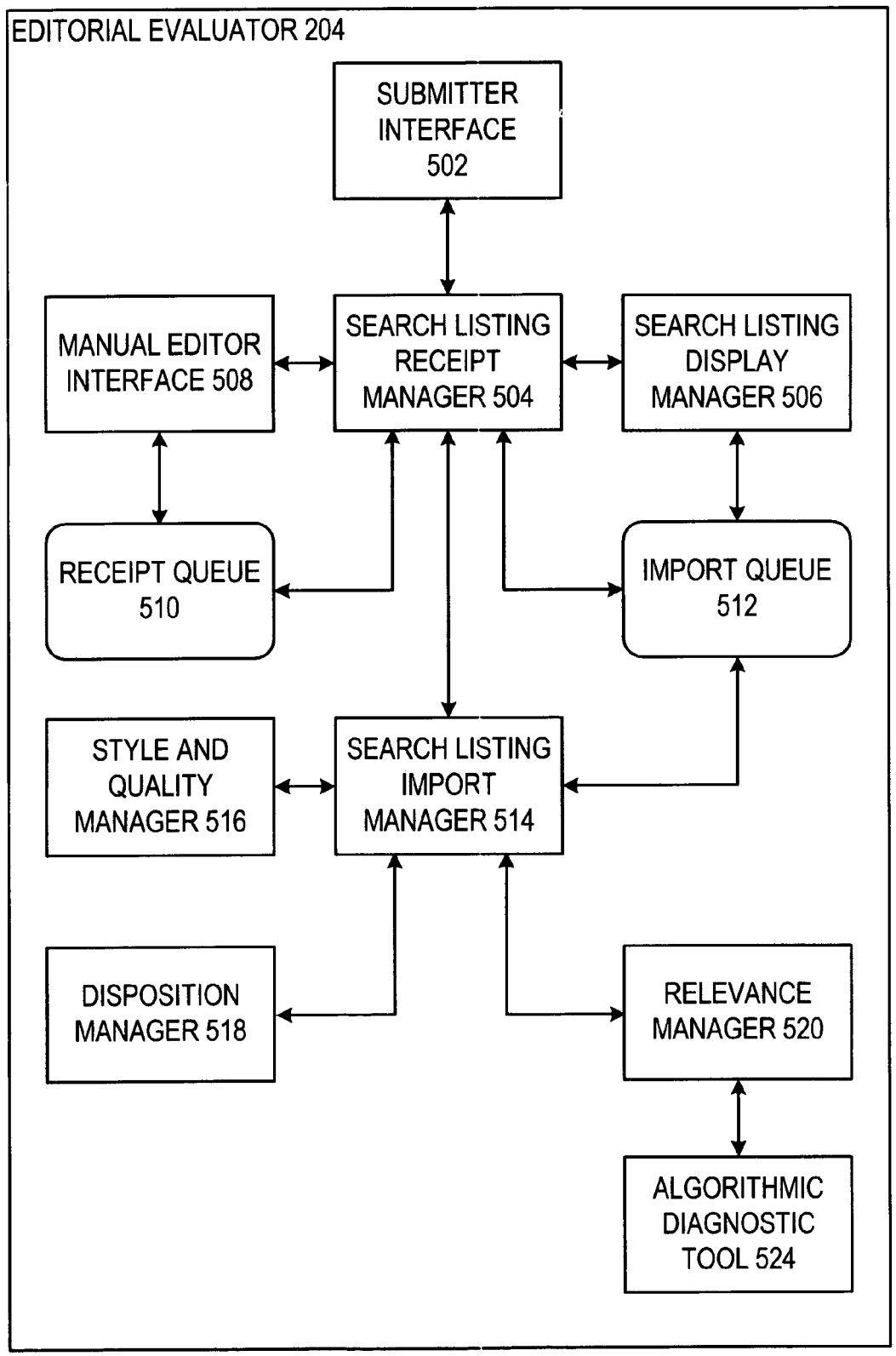
FIG. 5 is a block diagram of the editorial evaluator of FIG. 2 in greater detail.

Editorial evaluator 204 is shown in greater detail in FIG. 5. Submitter interface 502 receives the search listings from submission server 202 which is a web server in this illustrative embodiment. Search listings are received individually as CGI data received through Internet 104 conforming to the general structure shown in FIG. 3 or as a collection of multiple search listings in a data format readable by submission server 202, e.g., a table of comma-separated values or some other conventional spreadsheet-compatible format in this illustrative embodiment. Web servers, CGI, and various spreadsheet-compatible data formats are well known and are not described further herein.

Submitter interface 502 receives the search listings sought to be included in search database 208 and forwards the search listings to search listing receipt manager 504. Search listing receipt manager 504 creates a search listing receipt for each submitted search listing. A search listing receipt is a data structure which represents both the search listing and its status as it is processed by editorial evaluator 204. In addition to the fields shown in FIG. 3, a search listing receipt includes data representing the entity submitting the search listing, dates of creation and modification of the search listing receipt and of evaluation and completion of the processing of the receipt as well as other events in the evaluation, flags representing various types of content determined to be associated with the search listing, editorial notes, the person or system evaluating the search listing, various scores for such things as relevance and quality, current status, and final disposition.

Submitter Interface 502 requests creation of search listing receipts by placing data representing a search listing on a search listing receipt queue. Such data is processed by search listing receipt manager 504. In particular, search listing receipt manager 504 dequeues such data from the search listing receipt queue and forms a search listing receipt by combining such data with the various search listing receipt fields described above.

When a receipt is created for a particular search listing, the search listing—in the context of its receipt—is ready for evaluation for inclusion in search database 208. Search listing receipt manager 504 submits search listing receipts for such evaluation by placing such search listing receipts on an import queue 512.

Search listing import manager 514 manages processing of search listing receipts as they are considered for inclusion in search database 208. New candidate search listing receipts are dequeued by search listing import manager 514 from import queue 512. Search listing import manager 514 records data representing various assessments of the substance of each search listing receipt. Such completes step 402 (FIG. 4) in this illustrative embodiment.

Each search listing receipt processed by search listing import manager 514 (FIG. 5) is submitted to style and quality manager 516. In steps 404 (FIG. 4) and 406, style and quality manager 516 (FIG. 5) assesses quality and relevance, respectively, of the term specified in term field 304 (FIG. 3) in the context of description field 310 and the information identified by URL 306. Steps 404 (FIG. 4) and 406 are shown as being performed independently and concurrently. However, it should be appreciated that steps 404–406 can be performed sequentially in either order.

In step 404, style and quality manager 516 assesses the quality of the search listing. In particular, style and quality manager 516 assesses the information identified by URL 306 (FIG. 3) and the information contained within description field 310 for questionable, offensive, or sensitive content. It should be noted that, for illustration purposes, some objectionable terms are identified herein explicitly. No offense is intended.

Quality assessment in step 404 (FIG. 4) is described below in greater detail. Briefly, several categories of objectionable terms are maintained in search database 208 (FIG. 2). In this illustrative embodiment, these categories include blocked terms, suspect terms, sexual terms, gambling terms, junk text, banned terms, and indexed terms.

Blocked terms are terms so likely to be objectionable that any search listing containing a blocked term is marked for rejection by style and quality manager 516, even prior to further editorial evaluation. Examples include such terms as "whore," "incest," "bestiality," and "Microsoft sucks." Of course, terms which are even more objectionable can be imagined as well. Such terms are so likely to be offensive that the reputation of search engine 102 could be tarnished by including such terms in search results. In addition, the search engine may be required by law or contractual obligation to prevent display of specific objectionable terms to users. Accordingly, detection of a blocked term in a search listing results in immediate rejection of the search listing in this illustrative embodiment.

Suspect terms are terms which are potentially objectionable such that a search listing including such terms should be marked for closer evaluation. Examples include "body solutions," "city search," "nissan.com," "cable black box,"

"sexy girls," and "condoms." These and other suspect terms can be legitimate, non-objectionable search terms or can be objectionable and subject to rejection, depending upon the context and overall impression given by the suspect term. Accordingly, style and quality manager 516 marks a search listing which includes a suspect term for further review but not immediately for rejection.

Sexual terms are terms which are sexual in nature and/or appeal to prurient interests. Salacious content associated with a search listing is not necessarily grounds for rejection. However, it is preferred that users requesting searches are presented with the option of excluding sexual content since some users may find sexual content rather offensive and repugnant while other users may actually seek out sexual content. Accurately identifying information associated with a search listing as sexual in nature allows such search listings to be appropriately filtered in accordance with user-specified preferences.

Gambling terms are terms associated with gambling activities. Like sexual terms, gambling terms are not immediately marked for rejection but instead are identified as gambling terms to facilitate filtering to exclude gambling terms. Examples include "blackjack," "poker," "craps," and "slots." While some users may find gambling terms objectionable, more users find web sites pertaining to gambling simply annoying. Providers of sexual and gambling web sites often attempt to cause information about their web sites to be presented to users notwithstanding an absolute lack of interest in such web sites on the part of those users, perhaps in hopes of luring a curious new customer for a web-based pay service. As a result, many users searching for information find themselves bombarded with unwanted solicitations to visit sexually- and/or gambling-oriented web sites. By allowing gambling-oriented web sites and sexually-oriented web sites to be filtered from search results, the value of the search results provided by search engine 102 is significantly enhanced.

Junk text is nonsensical text, and style and quality manager 516 identifies junk text within a search listing. Junk text in a search listing produced as a search result can reflect poorly on search engine 102 and is therefore not allowed. Accordingly, style and quality manager 516 marks search listings associated with junk text immediately for rejection and for further review.

Germany requires that some terms be banned from web sites and other terms be indexed in web sites. Accordingly, if the subject search listing is applicable to the German marketplace as indicated in marketplace field 320 (FIG. 3), style and quality manager 516 (FIG. 5) identifies banned and/or indexed terms in the subject search listing. Detection of banned terms in the subject search listing result in immediate rejection of the search listing in the manner described herein with respect to blocked terms. In addition, detection indexed terms in the subject search listing results in marking of the subject search listing for manual editorial review in the manner described herein with respect to suspect terms.

In step 404 (FIG. 4), style and quality manager 516 (FIG. 5) of editorial evaluator 204 also checks each search listing for format and style. For example, URL 306 (FIG. 3) must specify a valid URL, e.g., a valid address of an existing web page in Internet 104. In addition, each field of search listing 300 has minimum and maximum field lengths and allowable data formats. Each field is checked by style and quality manager 516.

Style checking by style and quality manager 516 is described more completely below. Briefly, style checking involves rejection of search listings which include superlatives or contact information and undesirable style characteristics are automatically edited out of the search listing. For example, multiple consecutive instances of a punctuation mark (e.g., "Sale!!!") are replaced with a single instance (e.g., changed to "Sale!"), some punctuation marks are removed altogether (e.g., *, !, {, }, [, ], <, >, |, \, ^, =, and ~), and an exclamation point ending a sentence is replaced with a period. Exceptions are provided in search database 208 for legitimate uses of punctuation marks in trade names such as "Yahoo!" and "E*TRADE."

A few other style characteristics are enforced in this illustrative embodiment. URLs are not permitted in title field 308 (FIG. 3) and description field 310. Any URLs found there are replaced with only the domain name portion of the replaced URL. Title field 308 and description field 310 are properly capitalized in accordance with the grammar rules of the language in which the title and description are presented. It is preferred that acronyms are recognized and permitted to be in all capital letters and that unusually capitalized but otherwise legitimate proper nouns (e.g., "eBay") are also recognized and permitted. In addition, "Internet" is edited to begin with a capital "I" and double spaces are removed and space inserted after punctuation where ever appropriate in accordance with the language in which search listing 300 is submitted. By enforcing such style requirements, the reputation of search engine 102 as providing a professional, high-quality service is maintained and the users' experience is improved thereby increasing use of, and therefore value of, search engine 102.

Thus, style and quality manager 516 of editorial evaluator 204 assesses the search listing for objectionable content such as blocked terms, suspect terms, sexual terms, gambling terms, junk text, and banned and indexed terms and enforces format and style requirements in step 404.

In step 406, relevance manager 520 assesses the search listing for relevance of the referenced information to the associated search term. Relevance manager 520 assigns a relevance score ranging from 0 to 100 wherein 0 represents no relevance at all and 100 represents perfect relevance. Relevance scoring by relevance manager 520 is described more completely below. Briefly, style and quality manager 516 verifies such things as (i) does the address of URL 306 actually refer to an existing document (i.e., is the address functional)?, (ii) is the search term of term field 304 contained within the web page referenced by URL 306?, (iii) is the search term relevant to the web page referenced by URL 306?, (iv) is the search term relevant to the title and description specified in fields 308–310?, (v) are the title and description relevant to the web page referenced by URL 306?, (vi) is there adult and/or gambling content within the web page referenced by URL 306?, (vii) are the referenced information, title and description in a specific language, e.g., English?, and (viii) are there blocked and/or suspect content on the referenced web page? In addition, style and quality manager 516 determines whether the referenced document modifies navigation interfaces as implemented by client computers 108A–C in a manner determined by the provider of search engine 102 to be impermissible. For example, some documents can specify non-standard behavior of user interface mechanisms, such a "back" GUI buttons, to prevent a user from freely navigating the Web. In this illustrative embodiment, style and quality manager 516 disallows such navigational interference as a matter of policy and any search listings referencing such documents are rejected outright.

Once style and quality manager 516 and relevance manager 520 have determined in steps 404–406 the quality and relevance of the referenced web page, respectively, style and quality manager 516 and relevance manager 520 provide the results of those steps to search listing manager 514. Processing according to logic flow diagram 400 (FIG. 4) transfers to test step 408 in which disposition manager 518 of editorial evaluator 204 determines whether manual or automatic editorial evaluation is appropriate for the subject search listing 300.

Figure 6:
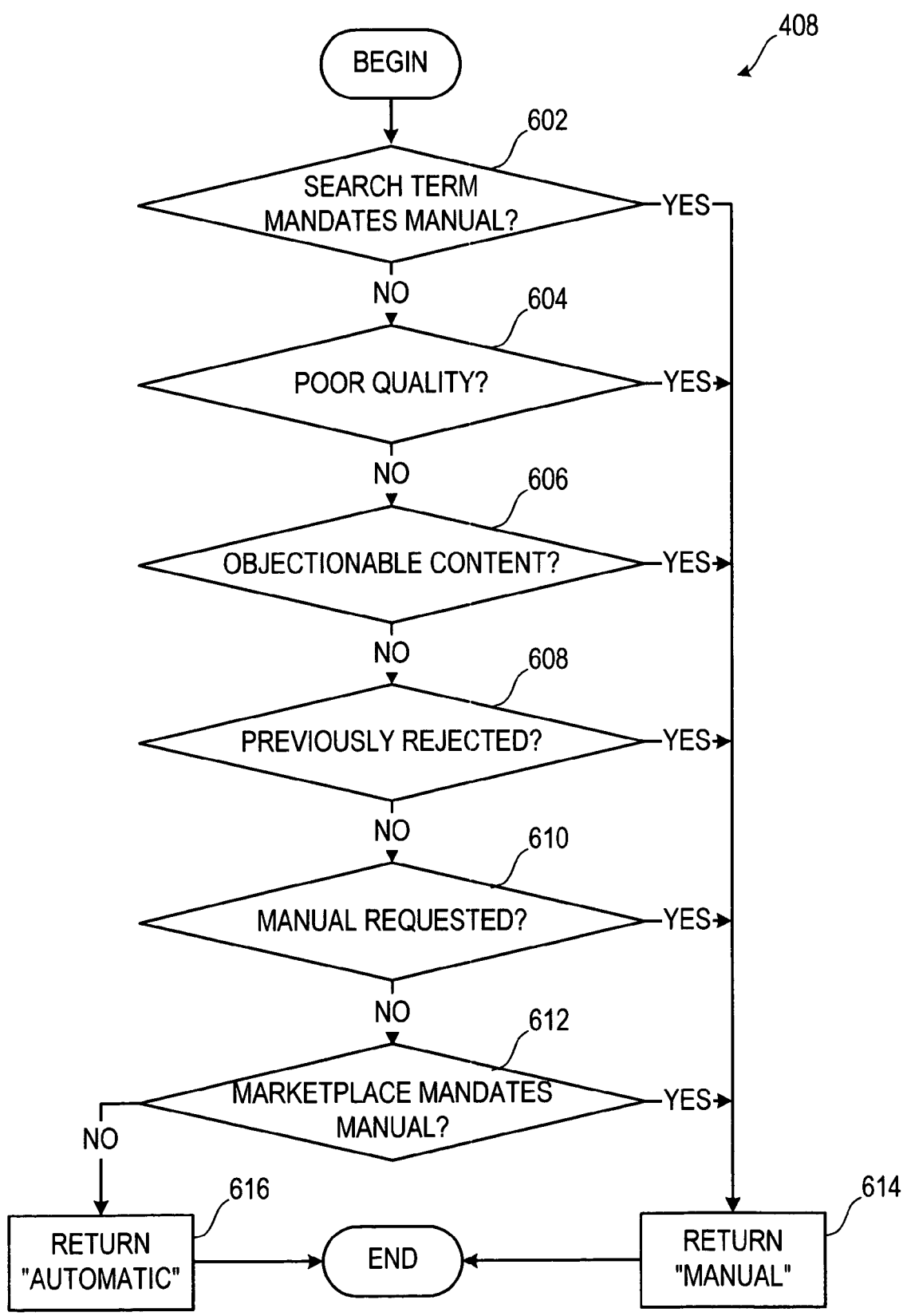
FIG. 6 is a logic flow diagram of disposition determination of a candidate search listing in accordance with the present invention.

Step 408 is shown in greater detail as logic flow diagram 408 (FIG. 6). In test step 602, disposition manager 518 determines whether the subject search term, as identified by term field 304 (FIG. 3), mandates manual evaluation. In general, some search terms are sufficiently ambiguous and/or sufficiently popular that manual evaluation is still warranted. In this illustrative embodiment, manual evaluation is mandated for search terms which have been searched at least 500 times in the prior month. In an alternative embodiment, manual evaluation is mandated for search terms which have been searched at least 1,000 times in the prior month. Of course, this threshold is illustrative only. The threshold can be increased or decreased to affect the proportion of search listings singled out for manual editorial evaluation. Search terms which have been searches fewer than the predetermined threshold number of times are identified as lower-volume search terms. Lower-volume search terms represent a lower-risk to the provider of search engine 102 of an unfavorable perception if an objectionable search listing for a lower-volume search term is included in search database 208 without manual editorial evaluation. Accordingly, the trade-off between processing efficiency versus careful and accurate assessment of search listings favors routing all search listings involving higher-volume search terms to manual evaluation. It should be appreciated that the specific predetermined threshold which identifies lower-volume search terms depends upon the respective values attributed to efficient analysis of submitted search listings and accurate assessment of quality of submitted search listing according to the business priorities of the provider of search engine 102.

If the subject search term mandates manual evaluation, processing transfers to step 614 in which step 408 determines that manual evaluation is appropriate. Accordingly, processing from test step 408 (FIG. 4) transfers to step 410 in which the search listing is evaluated in a manual process in the manner described more completely below. Conversely, if the subject search term does not mandate manual evaluation, processing transfers to test step 604 (FIG. 6).

In test step 604, disposition manager 518 determines whether the subject search listing is of poor quality as determined in steps 404–406. Examples of poor quality in this illustrative embodiment include (i) search terms, titles, descriptions, and URLs which are outside a predetermined range of acceptable lengths; (ii) a maximum bid which is outside a predetermined range of acceptable values; (iii) a title or description which includes superlatives; (iv) a title or description which includes contact information; and (v) a search listing with a relevance score below a predetermined threshold. Other criteria could also be considered depending on the editorial guidelines for search listing approval. In this illustrative embodiment, the predetermined threshold relevance score is set at sixty (60). A search listing with a relevance score of less than sixty (60) is determined to be of poor quality. Furthermore, a search listing with a relevance score is less than a second, lower predetermined threshold (e.g., forty (40) in this illustrative embodiment), is marked for automatic rejection without any manual editorial evaluation.

If the subject search listing is determined to be of poor quality, manual evaluation is determined in step 614. Conversely, if the subject search term is not determined to be of poor quality, processing transfers to test step 606.

In test step 606, disposition manager 518 determines whether the subject search listing includes and/or references objectionable content. Disposition manager 518 makes such a determination if any of the following conditions are met: (i) the subject search listing, e.g., search listing 300 (FIG. 3), is determined in step 404 to include blocked content, suspect content, adult content, gambling content, banned content, or indexed content or (ii) information associated with the subject search listing which is crawled for relevance analysis in step 406 is determined to include blocked content, suspect content, adult content, gambling content, banned content, or indexed content. It should be noted that junk text does not immediately disqualify the subject search listing for automatic evaluation in this illustrative embodiment and that other sets of requirements for determining objectionable content could be used as needed. If disposition manager 518 determines that the subject search listing includes and/or references objectionable content, processing transfers to step 614 in which manual evaluation is selected. Conversely, if disposition manager 518 does not determine that the subject search listing includes and/or references objectionable content, processing transfers to test step 608.

In test step 608, disposition manager 518 determines whether the URL of the subject search listing (e.g., stored in URL 306) has ever been previously determined to reference information which includes blocked content, suspect content, adult content, gambling content, banned content, or indexed content. In this illustrative embodiment, banned and indexed content are only checked in the subject search listing is applicable to the German marketplace. If URL 306 has previously been determined to reference such objectionable content, processing transfers to step 614 in which manual evaluation of the subject search listing is selected. Conversely, if disposition manager 518 does not determine that URL 306 has previously been rejected, processing transfers to test step 610. Disposition manager 518 maintains a list of previously rejected URLs to detect re-submitted URLs in newly submitted search listings.

In addition to recording previously rejected URLs, disposition manager 518 maintains statistics regarding previous dispositions of previously submitted search listings by each party. Thus, if a particular submitter of search listings has a relatively high percentage of submitted listings rejected, newly submitted search listings can be routed for manual editorial review regardless of the assessed quality and style of the newly submitted search listings. The percentage of previously rejected search listings can be based on a simple ratio of total search listings rejected to total search listings submitted. Alternatively, the percentage can be weighted such that more recently submitted are given greater consideration than earlier submitted search listings, thus implementing a type of forgiveness for submitters of search listings who improve the quality of submitted search listings over time. Thus, a relationship between the number of search listings submitted by a particular submitter and the number of those search listings rejected serves as a measure of the trustworthiness of the submitter. Other measures of trustworthiness can include how long the submitter has been submitting search listings—on the premise that long-time, return submitters are more trustworthy—and the volume of search listings submitted, measured as either the total number of search listings submitted or the total value bid for all search listings submitted by the submitter.

As described above, the consequence of unusually poor trustworthiness of the submitter is mandated manual editorial evaluation. Relatively highly trusted submitters can benefit in several ways. Search listings submitted by relatively highly trusted submitters can be routed for abbreviated and/or expedited manual editorial review if manual editorial review is determined to be warranted. Such abbreviated manual editorial review can omit various steps in the manual editorial evaluation process which can be considered redundant checks and/or cross checks. Expedited manual editor evaluation is appropriate since relatively highly trusted submitters, by definition, tend to submit search listings which are appropriate and would have few, if any, policy and/or style violations. Another way relatively highly trusted submitters can benefit is by provisional acceptance and inclusion in search database 208 of any submitted search listings pending manual review of the search listings if manual review is determined to be proper in the manner described herein. These benefits can also be combined such that search listings submitted by relatively highly trusted submitters are provisionally accepted and included in search database 208 pending subsequent abbreviated and/or expedited manual editorial evaluation is manual editorial evaluation is determined to be warranted.

In test step 610, disposition manager 518 determines whether manual evaluation has been requested by the submitter of the subject search listing. In submitting search listings for inclusion in search database 208, the user submitting each search listing is provided with the opportunity to request manual editorial evaluation of the search listing. A user may make such a request if acceptance of the search listing is questionable and delay in including the search listing in search database 208 is to be avoided. Such a request is recorded in search listing 300 in manual evaluation requested flag 318. If manual evaluation is requested, processing transfers to step 614 in which manual evaluation of the subject search listing is selected as described below. Conversely, if manual evaluation has not been requested for the subject search listing, processing transfers to test step 612.

In test step 612, disposition manager 518 determines whether the marketplace for which the subject search listing is intended mandates manual evaluation. As described above, each search listing, e.g., search listing 300, is associated with a marketplace, e.g., marketplace 320. In this illustrative embodiment, a marketplace is a country, network, or other unit having a culture and/or a set of laws specifying mores or other guidelines of propriety. In certain marketplaces, it is desirable to have all search listings carefully evaluated manually prior to inclusion in search database 208. For example, if a relatively new marketplace is served by search engine 102, it may take some time and experience to fully develop a list of blocked and suspect content for that marketplace. Diverting all search listings for that marketplace to manual evaluation allows that marketplace to be served prior to full development of a comprehensive list of block and suspect content to enable automated evaluation of search listing for that marketplace.

If a search listing is applicable to multiple marketplaces as indicated in marketplace field 320 (FIG. 3), the search listing is evaluated independently for each marketplace in which the search listing is applicable. Thus, is it possible that a search listing can be designated for manual editorial review based on applicability for one marketplace yet be designated for automated editorial review for another marketplace.

If disposition manager 518 determines that the marketplace of the subject search listing mandates manual evaluation, processing transfers to step 614 in which disposition manager 518 determines that the subject search listing is to be evaluated manually in step 410 (FIG. 4). Conversely, if disposition manager 518 (FIG. 5) determines that the marketplace does not mandate manual evaluation, processing transfers to step 616 (FIG. 6) in which disposition manager 518 determines that automatic analysis of the subject search listing as performed up to this point in processing is sufficient. Accordingly, upon determination in step 616 that automatic editorial evaluation is sufficient, the subject search listing is placed on-line, i.e., is included in search database 208 and is made available for presentation to a user as a resulting search listing in response to a search query. Thus, lower-risk, lower-volume search listings are processed very quickly and made available to the searching public in a very short amount of time and requiring very little human resources in approving such search listings for inclusion in search database 208.

Manual evaluation in step 614 involves human editors reading the various fields of the subject search listing and evaluating the subject search listing in view of predetermined editorial standards. Briefly, a human editor reads and evaluates the subject search listing for objectionable content as described herein. In particular, the human editor determines whether the search listing, or the information referenced by the search listing, includes blocked content and, if the search listing and/or associated information includes suspect content, the human editor can determine whether the suspect content is excessively objectionable given the context of the suspect content. The human editor also determines whether the search listing and/or associated information includes adult and/or gambling content. If the search listing is categorized as including adult and/or gambling content, inclusion of such content is not grounds for rejection of the search listing since proper categorization allows such content to be filtered by a user requesting a search. If the search listing includes junk text, the human editor determines whether the junk text is meaningless and/or confusing in the context of the entirety of the search listing and associated information. In addition, if the search listing is targeted at a particular marketplace for which content is banned (e.g., Germany), the human editor determines whether the search listing includes such banned or indexed content.

The ultimate determination as to whether a search listing is to be accepted or rejected is based upon a set of editorial guidelines which are based in part on business objectives and marketplace notions of propriety. As such, the editorial guidelines depend upon the prevailing obligations regarding such notions and objectives of search engine 102. If a search listing is rejected by a human editor, the submitter of the search listing is notified of such rejection and is provided with reasons for the rejection by the human editor. The submitter is provided with an opportunity to re-submit the search listing after amending the search listing to overcome the reasons for rejection and/or altering the style and/or content of the site to be referenced by the subject search listing.

Quality Assessment

Figure 7:
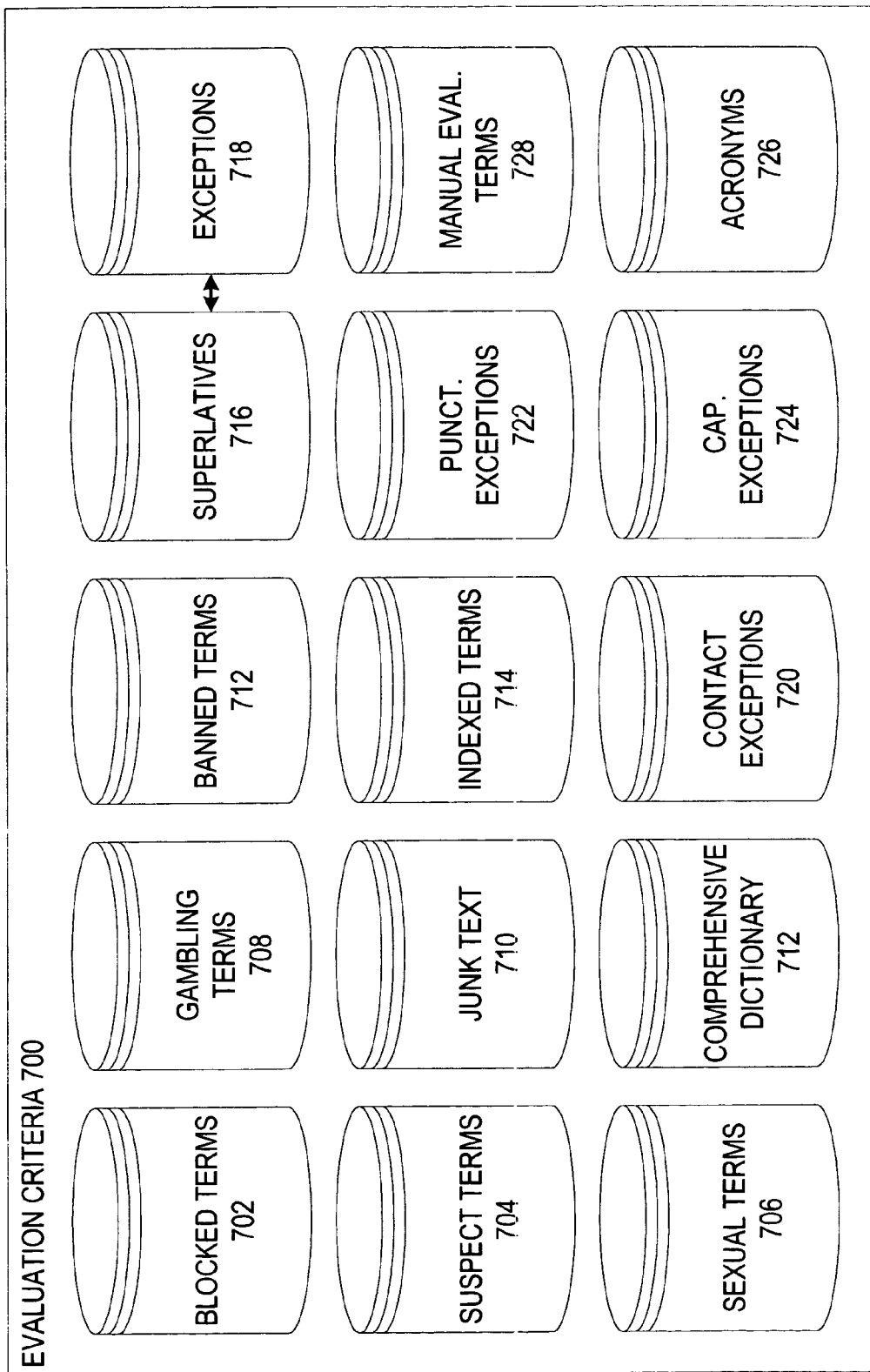
FIG. 7 is a block diagram showing editorial evaluation criteria used to evaluate search listings in accordance with the present invention.
Figure 8A:
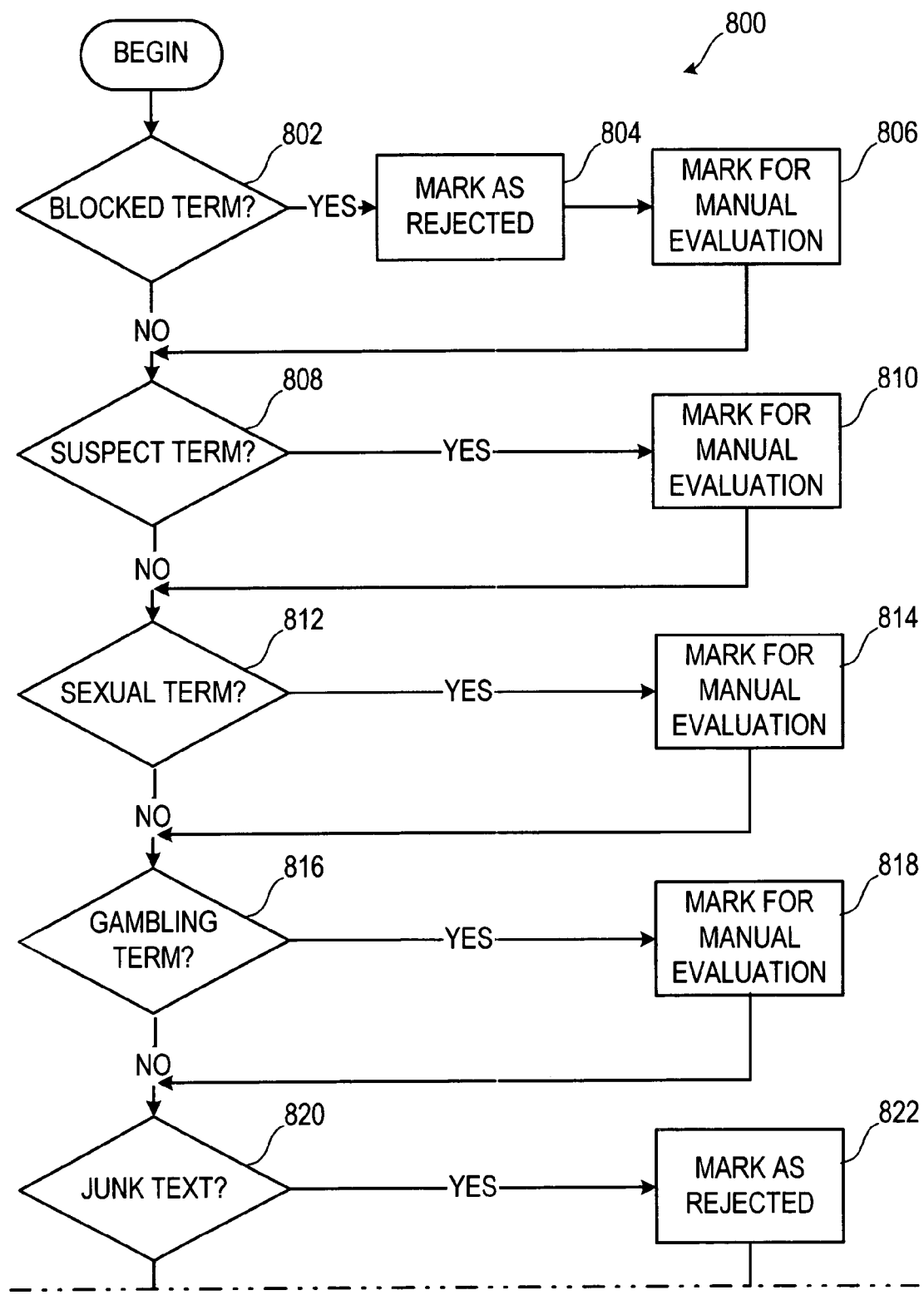
FIGS. 8A and 8B collectively represent a block diagram of a logic flow illustrating the determination that a candidate search listing includes objectionable content.
Figures 8, 8A, 8B:
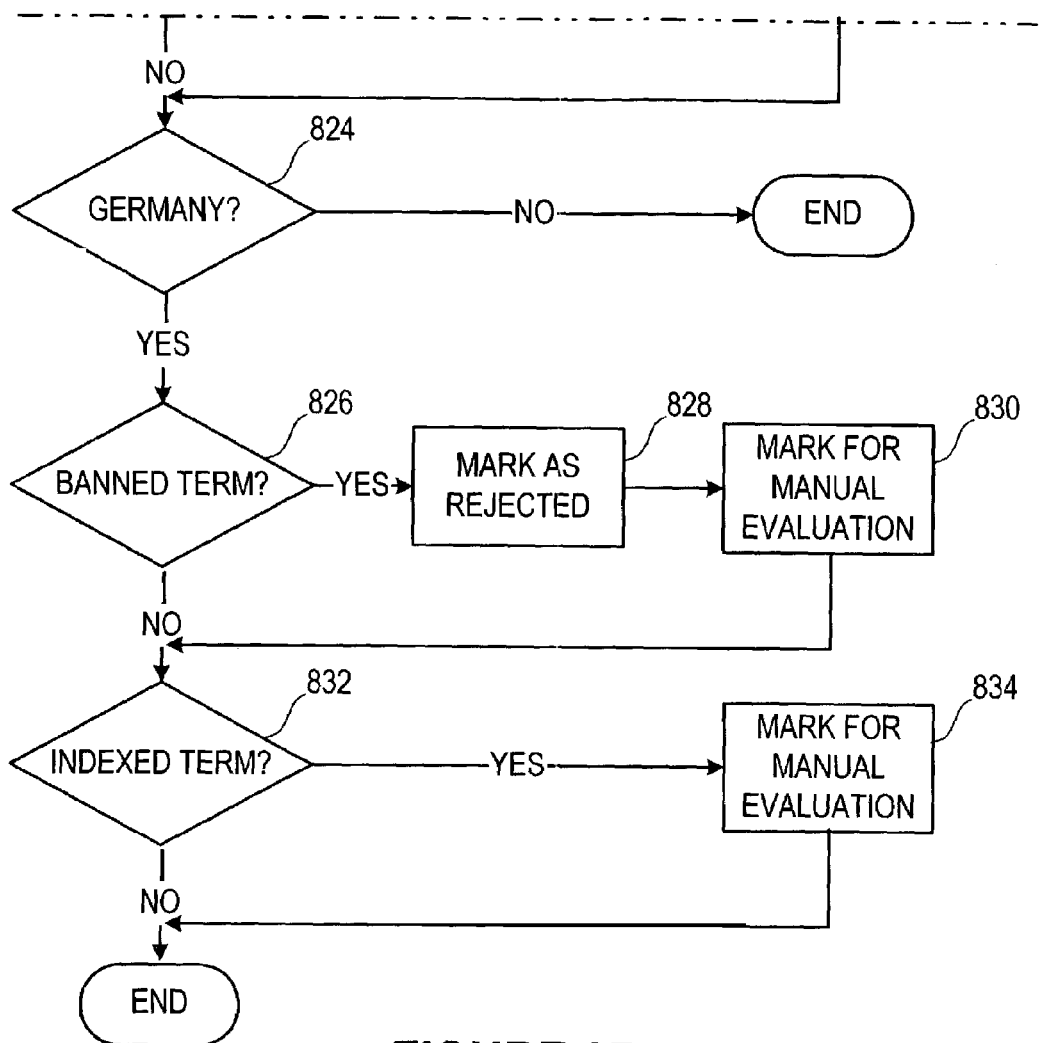

As described above with respect to step 404 (FIG. 4), style and quality manager 516 (FIG. 5) analyzes the quality of the subject search term. To do so, style and quality manager 516 uses evaluation criteria 700 (FIG. 7) which is a collection of databases and which is accessible to style and quality manager 516. Of course, evaluation criteria 700 are merely illustrative. Evaluation criteria 700 can be replaced with other criteria according to the particular content policies to be implemented and enforced within search engine 102. Processing by style and quality manager 516 in assessing quality of the subject search listing is illustrated in logic flow diagram 800 (FIG. 8). Initially within logic flow diagram 800, the subject search listing is marked—within its search listing receipt—as not rejected and for automated editorial evaluation.

In test step 802, style and quality manager 516 determines whether a blocked term or phrase is included in the search term, title, description, or URL of the subject search listing. Blocked terms and phrases are represented in block term database 702 (FIG. 7). In analyzing the search term itself, style and quality manager 516 compares both raw and canonical forms of the search term to blocked terms and phrases stored in blocked term database 702. As used herein, a canonical form of a word or phrase is the word or phrase as it appears in standard usage. If the search term of the subject search listing is non-standard, the raw and canonical forms will differ.

Style and quality manager 516 performs two distinct types of analysis in determining whether the search term represents a blocked term or phrase: sub-string comparison and token comparison. Which type of analysis is applicable is determined by the particular term or phrase and is predetermined and specified in each of the databases of evaluation criteria 700 (FIG. 7).

In both types of analysis, comparison by style and quality manager 516 is case—and accent-insensitive. For example, the blocked term, "incest," matches "Incest," "inCest," and "íncest." Sub-string analysis matches word or phrases which includes the blocked term as a sub-string. For example, "familyincest," and "incestisbest" match the blocked term, "incest." Similarly, unusual punctuation does not preclude matching of the blocked term; ".ince.est." and "i!n!c!e!s!t" match the blocked term, "incest."

Token analysis matches only whole words as delimited by a predetermined set of delimiters. In this illustrative example, the predetermined set of delimiters include white space (spaces and tabs and such) and the following characters: comma, period, semicolon, colon, apostrophe, quotation mark, exclamation point, at sign ("@"), pound sign, dollar sign, percent sign, ampersand, asterisk, carat, parentheses, underscore, hyphen, plus sign, equals sign, square and regular brackets, vertical bar ("|"), less-than sign, greater-than sign, question mark, slash ("/"), accent ("`"), and tilde. Token analysis is generally preferred for objectionable terms which can be sub-strings of unobjectionable terms. For example, "rape" can be a blocked term, but "grape" and "scrape" should not be blocked.

Style and quality manager 516 compares the search term, title, description, and URL of the subject search listing to blocked terms stored in blocked term database 702 according to the type of analysis specified for each term: either sub-string or token. If a blocked term is found in any of those fields, processing transfers to step 804 in which style and quality manager 516 marks the subject search listing for rejection. In step 806, style and quality manager 516 marks the subject search listing for manual editorial evaluation. If not blocked term is found in any of those fields of the subject search listing in test step 802, style and quality manager 516 skips steps 804–806 and the subject search listing remains unmarked for rejection and marked for automated editorial evaluation.

In test step 808, style and quality manager 516 determines whether the search term, title, description, or URL of the subject search listing includes a suspect term or phrase. Suspect terms and phrases are represented in suspect term database 704 of evaluation criteria 700. Analysis in test step 808 is analogous to the determination of included blocked terms described above with respect to test step 802. If the search term, title, description, or URL of the subject search listing includes a suspect term or phrase, processing transfers to step 810 in which style and quality manager 516 marks the subject search listing for manual editorial evaluation. The flag indicating whether the subject search listing is to be rejected is not affected and remains as set prior to test step 808. If the search term, title, description, and URL of the subject search listing are determined to not include a suspect term or phrase, style and quality manager 516 skips step 810.

In test step 812, style and quality manager 516 determines whether the search term, title, description, or URL of the subject search listing includes a sexual term or phrase. Sexual terms and phrases are represented in sexual term database 706 of evaluation criteria 700. Analysis in test step 812 is analogous to the determination of included blocked terms described above with respect to test step 802. If the search term, title, description, or URL of the subject search listing includes a sexual term or phrase, processing transfers to step 814 in which style and quality manager 516 marks the subject search listing for manual editorial evaluation. The flag indicating whether the subject search listing is to be rejected is not affected and remains as set prior to test step 812. If the search term, title, description, and URL of the subject search listing are determined to not include a sexual term or phrase, style and quality manager 516 skips step 814.

In test step 816, style and quality manager 516 determines whether the search term, title, description, or URL of the subject search listing includes a gambling term or phrase. Sexual terms and phrases are represented in gambling term database 708 of evaluation criteria 700. Analysis in test step 816 is analogous to the determination of included blocked terms described above with respect to test step 802. If the search term, title, description, or URL of the subject search listing includes a gambling term or phrase, processing transfers to step 818 in which style and quality manager 516 marks the subject search listing for manual editorial evaluation. The flag indicating whether the subject search listing is to be rejected is not affected and remains as set prior to test step 816. If the search term, title, description, and URL of the subject search listing are determined to not include a gambling term or phrase, style and quality manager 516 skips step 818.

In test step 820, style and quality manager 516 determines whether the search term, title, or description of the subject search listing includes junk text. The URL of the subject search listing is not checked for junk text in this illustrative embodiment. However, in an alternative embodiment, style and quality manager 516 includes the URL of the subject search listing in the analysis of junk text.

Various items of junk text are represented in junk text database 710 of evaluation criteria 700. Any match in that database found by style and quality manager 516 indicates that the search listing contains junk text and a positive condition is detected in test step 820. In addition, style and quality manager 516 compares the search term, title, and description of the subject search listing to the contents of comprehensive dictionary 712 of evaluation criteria 700. Comprehensive dictionary 712 represents all words from all search terms, titles, and descriptions stored in search database 208 (FIG. 2). If style and quality manager 516 is unable to match any word of the search term, title, or description of the subject search listing in comprehensive dictionary 712, style and quality manager 516 determines that the subject search listing includes junk text.

If the search term, title, or description of the subject search listing includes a gambling term or phrase, processing transfers to step 822 in which style and quality manager 516 marks the subject search listing for rejection. The flag indicating whether the subject search listing is to be manually evaluated is not affected and remains as set prior to test step 820. If the search term, title, and description of the subject search listing are determined to not include a gambling term or phrase, style and quality manager 516 skips step 822.

If the subject search listing is for the German marketplace, banned and indexed terms must also be checked. Otherwise, quality checking is complete. Thus, if quality and style manager 516 determines in test step 824 that the marketplace for the subject search listing is not Germany, processing according to logic flow diagram 800 completes. Conversely, if the subject search listing is for the German marketplace, processing transfers from test step 824 to test step 826.

In test step 826, style and quality manager 516 determines whether the search term, title, description, or URL of the subject search listing includes a banned term or phrase. Banned terms and phrases are represented in banned term database 712 of evaluation criteria 700. Analysis in test step 826 is analogous to the determination of included blocked terms described above with respect to test step 802. If the search term, title, description, or URL of the subject search listing includes a banned term or phrase, processing transfers to step 828 in which style and quality manager 516 marks the subject search listing for rejection. In step 830, style and quality manager 516 marks the subject search listing for manual editorial evaluation. If the search term, title, description, and URL of the subject search listing are determined to not include a banned term or phrase, style and quality manager 516 skips steps 828–830.

In test step 832, style and quality manager 516 determines whether the search term, title, description, or URL of the subject search listing includes an indexed term or phrase. Indexed terms and phrases are represented in indexed term database 714 of evaluation criteria 700. Analysis in test step 832 is analogous to the determination of included blocked terms described above with respect to test step 802. If the search term, title, description, or URL of the subject search listing includes an indexed term or phrase, processing transfers to step 834 in which style and quality manager 516 marks the subject search listing for manual editorial evaluation. The flag indicating whether the subject search listing is to be rejected is not affected and remains as set prior to test step 832. If the search term, title, description, and URL of the subject search listing are determined to not include a suspect term or phrase, style and quality manager 516 skips step 834.

After steps 832–834, processing according to logic flow diagram 800 completes. In this illustrative embodiment, separate flags are maintained for each search listing for detected conditions. In particular, each search listing receipt includes flags for blocked terms, blocked URLs, suspect terms, suspect URLs, sexual terms, sexual URLs, gambling terms, gambling URLs, junk text terms, junk text URLs, banned terms, banned URLs, indexed terms, and indexed URLs. Flags for blocked, suspect, sexual, gambling, junk text, banned, and indexed terms indicate the presence of blocked, suspect, sexual, gambling, junk text, banned, and indexed terms or phrases in a search listing's search term, title, or description. Flags for blocked, suspect, sexual, gambling, junk text, banned, and indexed URLs indicate the presence of blocked, suspect, sexual, gambling, junk text, banned, and indexed terms or phrases in a search listing's URL. The use of separate flags facilitates representation to the submitter of the search listing the reasons for rejection of and/or concern regarding the submitted search listing. Furthermore, maintaining flags specific to the URL of a search listing enables quick detection and analysis of other search listings for the same, objectionable web page.

Style Assessment

Figure 9A:
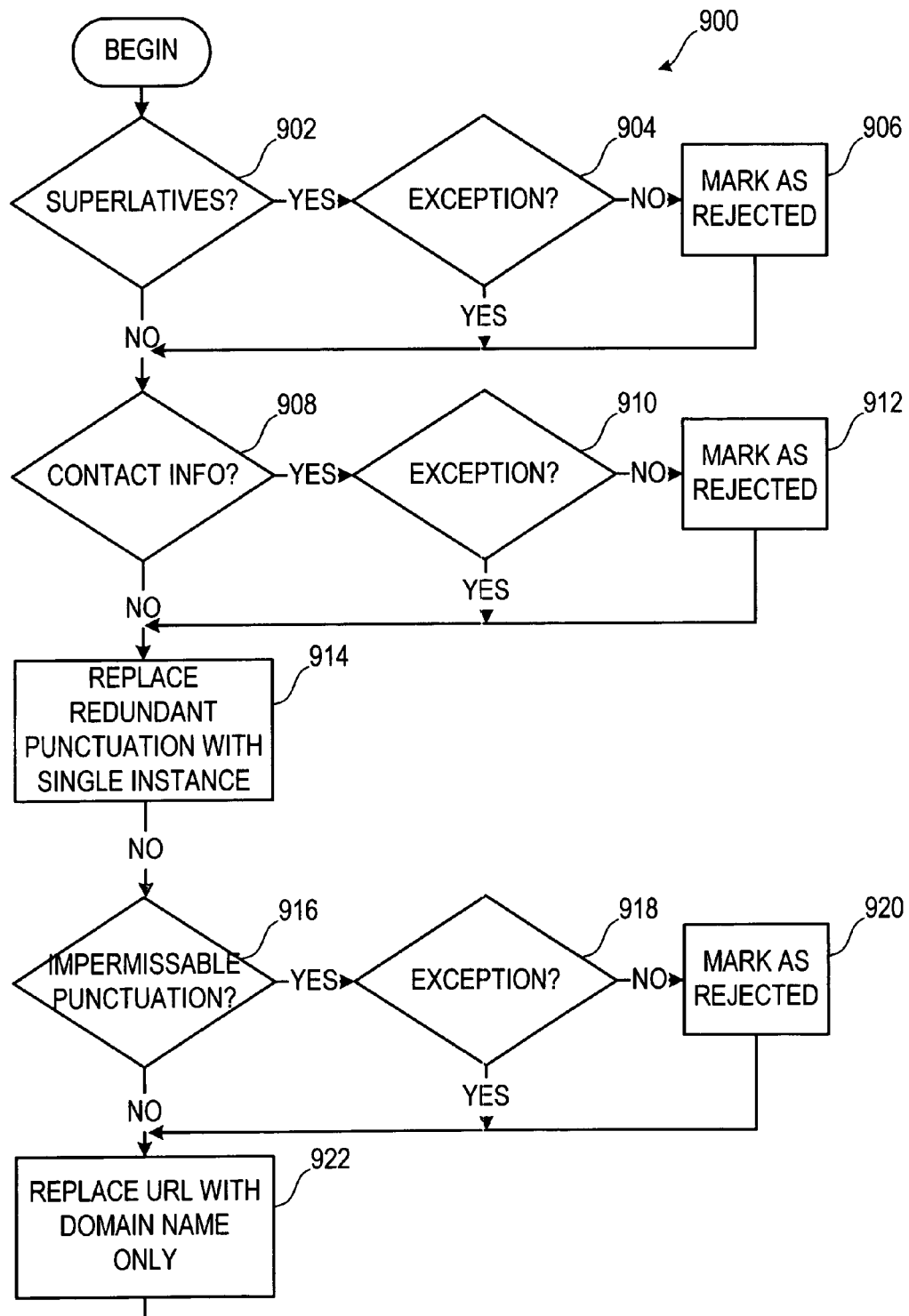
FIGS. 9A and 9B collectively represent a block diagram of a logic flow illustraing the enforcement of style policy for a candidate seach listing in accordance with the present invention.
Figures 9, 9A, 9B:
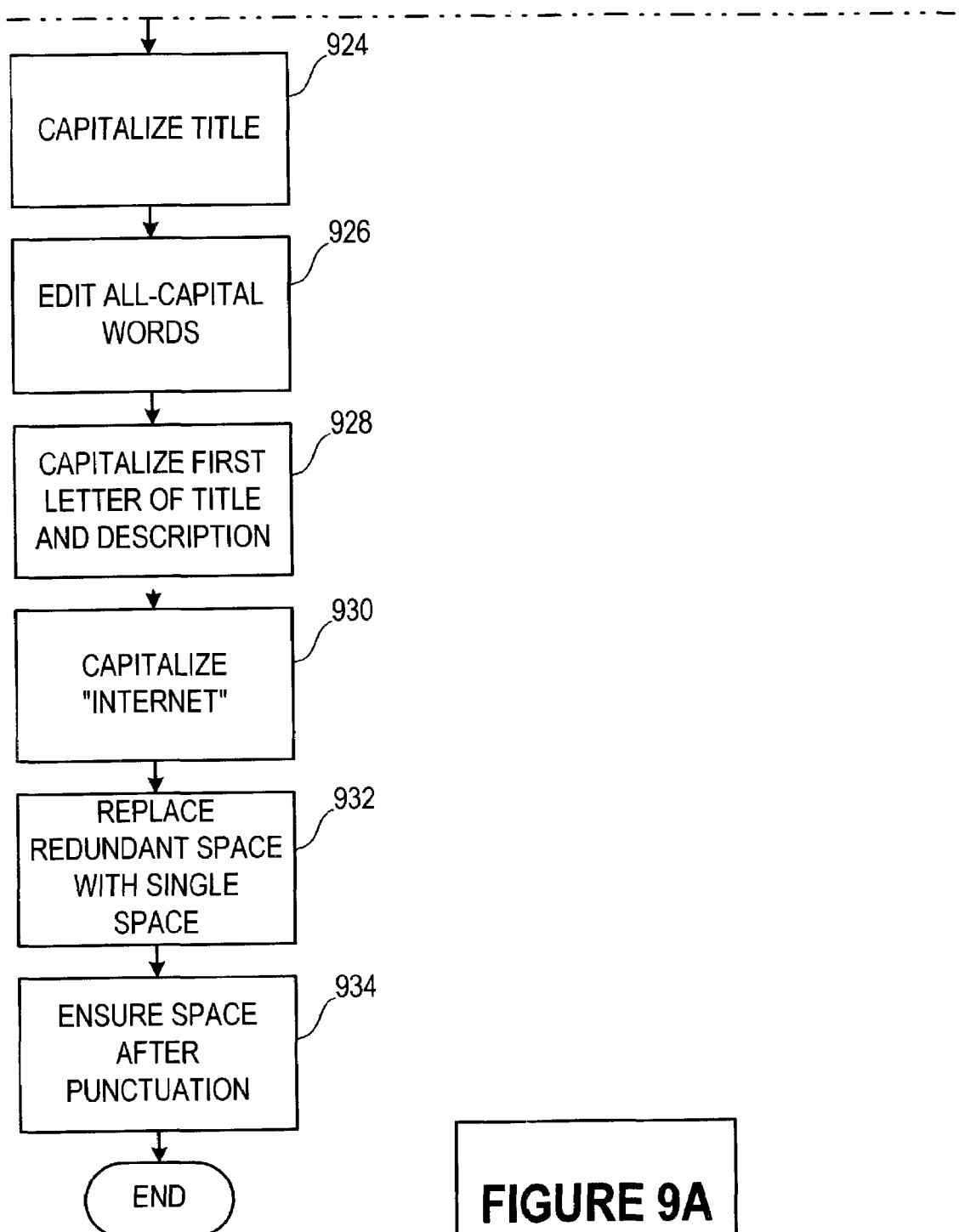

As described above, also with respect to step 404 (FIG. 4), style and quality manager 516 assesses the stylistic qualities of the subject search listing and enforces certain style rules upon the subject search listing. Processing by style and quality manager 516 in assessing and enforcing style of the subject search listing is illustrated in logic flow diagram 900 (FIG. 9).

In test step 902, style and quality manager 516 determines whether the title or description of the subject search listing includes superlatives. By disallowing superlatives in the titles and descriptions of search listings, inadvertent endorsements by search engine 102 are avoided. Style and quality manager 516 detects superlatives by finding matching entries in superlatives database 716 of evaluation criteria 700.

If style and quality manager 516 determines that the title or description of the subject search listing includes a superlative, processing transfers to test step 904 in which style and quality manager 516 determines whether any matching superlatives are permissible exceptions as represented in superlative exceptions database 718. An example of a permissible exception is a legitimate business name which includes a superlative, such as "BestBuy." If any matching superlatives are not permissible exceptions, processing transfers to step 906 in which style and quality manager 516 marks the subject search listing for rejection. Conversely, if no superlatives are found in the title or description of the subject search listing or if all matching superlatives are permissible exceptions, processing by style and quality manager 516 skips step 906.

In test step 908, style and quality manager 516 determines whether the title or description of the subject search listing includes contact information such as an address, telephone of fax number, or e-mail address. Style and quality manager 516 makes such a determination by looking for well-known patterns of telephone numbers, e-mail address, and postal addresses in the title and description of the subject search listing. If style and quality manager 516 determines that the title or description of the subject search listing includes contact information, processing transfers to test step 910 in which style and quality manager 516 determines whether all detected contact information are permissible exceptions as represented in contact exceptions database 720. One such permissible exception are legitimate business names which also constitute contact information. For example, a number of legitimate business names are toll-free telephone numbers—e.g., 1-800-FLOWERS.

If some contact information in the title or description of the subject search listing is not a permissible exception, processing transfers to step 912 in which style and quality manager 516 marks the subject search listing for rejection. Conversely, if no contact information is found in the title or description of the subject search listing or if all such contact information represents permissible exceptions as represented in contact exceptions database 720, style and quality manager 516 skips step 912.

In step 914, style and quality manager 516 replaces redundant punctuation in the title and description of the subject search listing with single instances of the redundant punctuation. For example, "Sale!!!" in a title is replaced with "Sale!" Similarly, "Save $$$!" in a description is replaced with "Save $!" In this illustrative embodiment, exceptions include an em-dash represented as two adjacent hyphens ("- -") and an ellipsis represented as three adjacent periods or three adjacent asterisks ("..." or "* * *") and an ellipsis followed by a period represented as four adjacent periods (". . . ."). In an alternative embodiment, three adjacent asterisks are impermissible as an ellipsis; only three adjacent periods are permitted.

In test step 916, style and quality manager 516 determines whether the title or description of the subject search listing includes impermissible punctuation. In this illustrative embodiment, the following punctuation marks are impermissible: "*," "!," "[," "]," "{," "}," "<," ">," "/," "|," "^," "*," "_," "=," and "~." If the title or description of the subject search listing include impermissible punctuation, processing transfers to test step 918 in which style and quality manager 516 determines if the impermissible punctuation marks are exceptions as represented within punctuation exception database 722. Examples of such exceptions are legitimate business names which include such punctuation marks—e.g., E*TRADE and Yahoo!. If any of the impermissible punctuation marks are not legitimate exceptions, processing transfers to step 902 in which impermissible punctuation marks are removed and exclamation points are replaced with periods. If the title and description of the subject search listing do not include impermissible punctuation or if such punctuation represents exceptions as represented in punctuation exception database 722, style and quality manager 516 skips step 920.

In step 922, style and quality manager 516 replaces any URLs in the title and description of the subject search listing with only the domain name portion of the replaced URL. For example, style and quality manager 516 replaces "http://www.dog.com/index.html" with "dog.com" in step 922.

In step 924, style and quality manager 516 capitalizes the first letter of each word in the title of the subject search listing. Of course, style and quality manager 516 performs such capitalization in accordance with the language of the marketplace of the subject search listing. For example, in English-language marketplaces, determinants such as "a," "an," and "the" are not capitalized. Words which are not to be capitalized are represented in capitalization exception database 724 (FIG. 7).

In step 926, style and quality manager 516 changes any words in the title or description of the subject search listing which are in all capital letters to a capital first letter and lower-case letters for the remainder of the word. Exceptions are represented in acronym database. Accordingly, style and quality manager 516 leaves legitimate acronyms in all capital letters.

In step 928, style and quality manager 516 capitalizes the first word of both the title and the description of the subject search listing. In step 930, style and quality manager 516 capitalizes all instances of the word, "Internet," in both the title and the description of the subject search listing.

In step 932, style and quality manager 516 replaces contiguous strings of multiple space characters in the title and description of the subject search listing with a single space character. Thus, "Big Sale!" in the title becomes "Big Sale!" In step 934, style and quality manager 516 adds a space character after each punctuation mark which is followed immediately by a non-space character. Exceptions represented in punctuation exception database 722 are used to ensure that space characters are not inserted within legitimate uses of punctuation within words. For example, "Big Sale!Click Here!" becomes "Big Sale! Click Here!" while "E*TRADE" remains unchanged in step 934.

After step 934, processing according to logic flow diagram 900 completes and style editing of the subject search listing by style and quality manager 516 completes. Improving the style of the search listings produced by search engine 102 improves the overall impression of search engine 102 by users thereof. Accordingly, users are more likely to access information represented by viewed search listings, sometimes referred to here as "clicking through," and the value of the service provided by search engine 102 to both users and owners of submitted search listings is significantly improved.

Relevance Scoring

As described above with respect to step 406, relevance manager 520 causes algorithmic diagnostic tool 524 to analyze relevance of the subject search listing and the associated web page. In this illustrative embodiment, algorithmic diagnostic tool 524 provides an application programming interface (API) by which relevance manager 520 deposits search listings with algorithmic diagnostic tool 524 for relevance analysis and later fetches results of such analysis from algorithmic diagnostic tool 524. Relevance manager 520 fetches results of relevance analysis when signaled by algorithmic diagnostic tool 524 that results are ready to be fetched.

Figure 10:
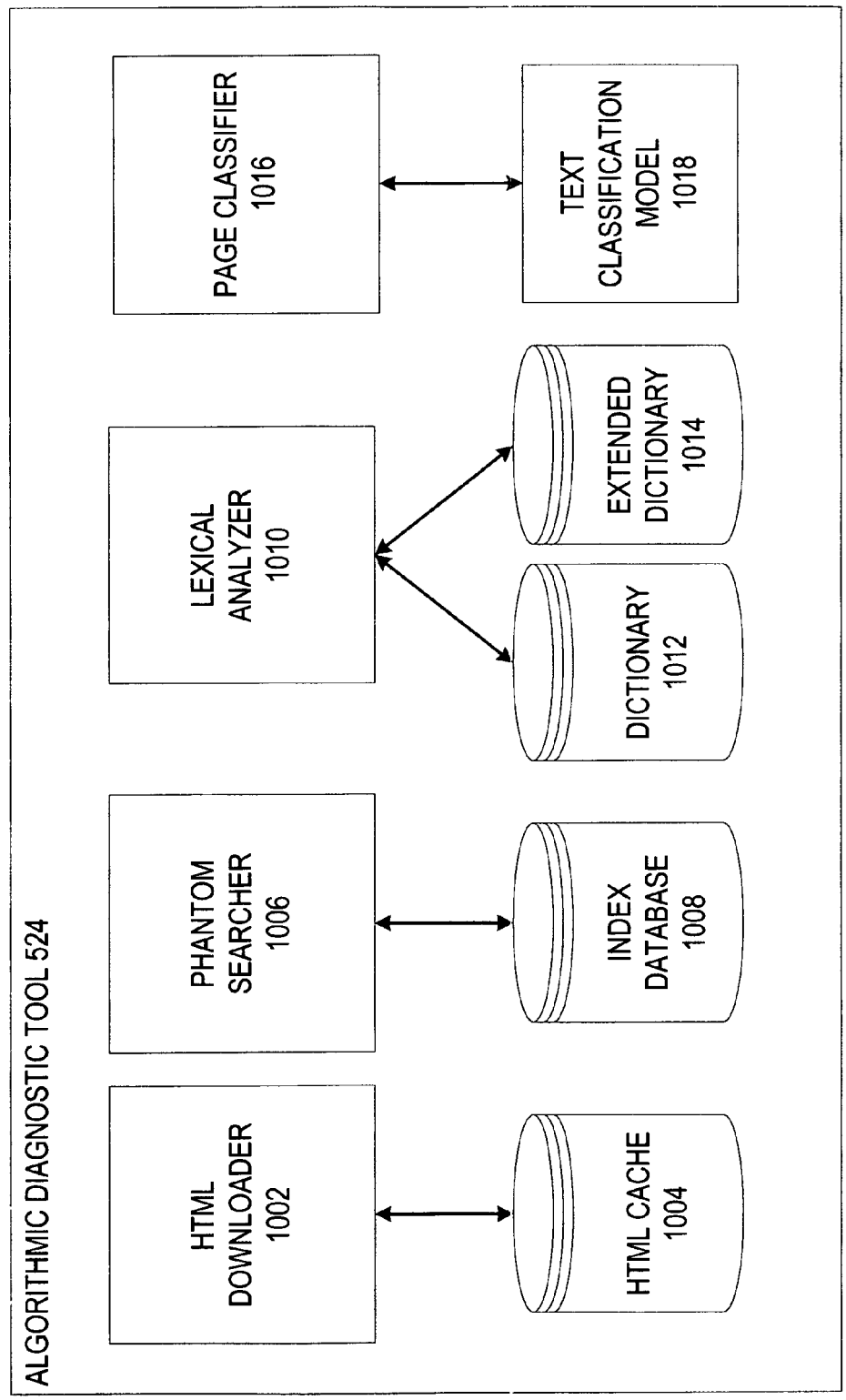
FIG. 10 is a block diagram showing an algorithmic diagnostic tool of FIG. 5 in greater detail.

Algorithmic diagnostic tool 524 is shown in greater detail in FIG. 10. HTML downloader 1002 downloads web pages referenced by search listings for relevance analysis. HTML downloader 1002 can crawl a web site, i.e., retrieve web pages recursively, to a predetermined link depth. If the link depth is one, HTML downloader 1002 retrieves the web page referenced by the URL of the search listing and, at link depth one, all pages referenced by that web page. If the link depth is two, HTML downloader 1002 retrieves all web pages referenced by web pages at link depth one. In this illustrative embodiment, the predetermined link depth is zero. Thus, only the web page referenced directly by the URL of a search listing is retrieved by HTML downloader 1002. In addition, the link depth can specify that only links commonly hosted with the web page are traversed and analyzed. Specifically, only links having the same base domain name are analyzed. Thus, a web page is not penalized for lack of relevance of referenced documents provided by others.

HTML downloader 1002 stores any retrieved web pages in a HTML cache 1004 for later analysis. This enables HTML downloader 1002 to schedule web page retrieval for times of relatively light network traffic and to avoid retrieving numerous web pages from a single one of host computers 108A–D, thus avoiding excessive interference with the business of that host computer.

Phantom searcher 1006 uses a conventional text searching technique for determining relevance scores for three relationships. The relationships involve the search term of a subject search listing, the title and description fields of the subject search listing, and the web page referenced by the URL of the subject search listing. Phantom searcher 1006 uses Lucene, a known and conventional text searching engine which is part of the open-source Jakarta project associated with the Apache web server project. Lucene is only briefly described herein to facilitate a full appreciation of the operation of the described illustrative embodiment. Briefly, Lucene provides a relevance score for a specified search term and a specified reference text.

Phantom searcher 1006 provides the search term of the subject search listing and, as a reference text, the title and description of the subject search listing and performs relevance analysis using Lucene index database 1008. Accordingly, phantom searcher 1006 obtains a relevance score representing the relevance of the search term to the title and description of the search listing. Such measures the degree to which the search term relates to the information sought to be associated with the search term.

Phantom searcher 1006 provides the search term of the subject search listing and, as a reference text, the web page referenced by the URL of the subject search listing as stored in HTML cache 1004 and performs relevance analysis using Lucene index database 1008. Accordingly, phantom searcher 1006 obtains a relevance score representing the relevance of the search term to the web page referenced by the search listing. As described more completely above, a search listing with a relevance score below a predetermined threshold, e.g., sixty, is of sufficiently questionable quality that manual editorial evaluation of the search listing is required. Furthermore, if the relevance score of the search listing is below a second, lower predetermined threshold, e.g., forty, the search listing is automatically rejected.

Phantom searcher 1006 provides the title and description of the subject search listing and, as a reference text, the web page referenced by the URL of the subject search listing as stored in HTML cache 1004 and performs relevance analysis using Lucene index database 1008. Accordingly, phantom searcher 1006 obtains a relevance score representing the relevance of the search listing's title and description to the web page referenced by the search listing.

It should be appreciated that there are various ways to score relevance of one text to another. However, in this illustrative embodiment, the following TFIDF (Term Frequency, Inverse Document Frequency) formula is used to quantify relevance of one or more terms to a body of text represented as a document:

$$\text{Relevance Score} = \sum_{t=term} \left( \frac{(tf_q)(idf)}{norm_q} \right) \left( \frac{(tf_d)(idf)}{norm_d} \right) coord \quad (1)$$

In equation (1), $tf_q$ represents the square root of the frequency of the term t in the query. In particular, a given term can be present in a search query more than once. The square root of the term t in the document is represented by $tf_d$. The inverse document frequency idf is determined according to the following equation:

$$idf = \log\left( \frac{\text{number of documents}}{\text{document frequency}} + 1 \right) + 1 \quad (2)$$

In equation (2), the number of documents is the total number of documents in the index database and document frequency is the number of documents in the index which include the term t.

Returning to equation (1), $norm_q$ is determined according to the following equation:

$$norm_q = \sqrt{\sum_{t=term} \left( (tf_q)(idf) \right)^2} \quad (3)$$

Returning again to equation (1), $norm_d$ represents the square root of the number of tokens in the document in the same field as the term t. Lastly, coord is determined according to the following equation:

$$coord = \frac{terms_{total}}{terms_{query}} \quad (4)$$

where $terms_{total}$ represents the total number of terms in the query and document combined and $terms_{query}$ represents the total number of terms in the search query.

Prior to relevance determination, both bodies of text to be compared, e.g., the search query and the web page associated with a search listing, are preprocessed to improve accuracy of relevance comparisons. The first step of the preprocessing is tokenization. Specifically, the body of text is divided into words delimited by white space and punctuation. The body of text is made case-insensitive by converting the entirety of the text to a uniform case—e.g., lower-case in this illustrative embodiment. Stop words, i.e., those words which are commonly used but which carry little semantic meaning—such as "a," "an," "of," "the," etc., are removed from the text. Lucene's Porter Stemming mechanism is applied to the text to remove verb tense endings such as "ed" and "ing." In addition, common spelling errors are removed and plural words are converted to singular form. Thus, the text is distilled such that the substantive content of the text is more easily comparable.

Phantom searcher 1006 normalizes these three relevance scores to floating point values between zero and one and combines them using, in this illustrative embodiment, a weighted average. Of course, various weights and mathematical combinations can be used to arrive at an assessment of relative relevance. However, in this illustrative embodiment, the three relevance scores are normalized to a floating point value between 0.0 and 1.0 prior to calculated a weighted average of the normalized scores. The specific weights used in this illustrative embodiment are (i) 2.0 for the relevance score between the search term and the referenced web page; (ii) 0.75 for the relevance score between the search term and the title of the search listing; and (iii) 0.5 for the relevance score of the title and description to the referenced web page.

To normalize the various relevance scores prior to forming the weighted average, phantom searcher 1006 applies the following equation to each relevance score:

$$f(x) = 1 - \frac{1}{C^x} \quad (5)$$

In equation (5), x represents the relevance score and f(x) represents the normalized relevance score which is between the values 0.0 and 1.0. C is a constant selected according to the distribution of x. In this illustrative embodiment, C is selected such that the average relevance score is normalized to the value 0.5. Using a measured average x (represented as $x_{average}$), C is determined by solving the following equation:

$$0.5 = 1 - \frac{1}{C^{x_{average}}} \quad (6)$$

Lexical analyzer 1010 improves accuracy of relevance scores determined by phantom searcher 1006. In particular, if a search listing is determined by phantom searcher 1006 to have a particularly low relevance score, lexical analyzer 1010 collects semantic alternatives for the search term of the subject search listing and causes phantom searcher 1006 to score relevance for the subject search listing using such semantic alternatives. In this illustrative embodiment, semantic alternatives include synonyms, hyponyms, and meronyms and are represented in dictionary 1012. Dictionary 1012 can be the known and conventional WorldNet lexical database of the English language and is not described further herein. Extended dictionary 1014 is an extension of dictionary 1014 and represents equivalency relationships between search terms as determined by search engine 102 and/or by human providers of search engine 102. Extended dictionary 1014 allows accuracy of relevance scores returned by algorithmic diagnostic tool 524 to be fine tuned and improved as experience analyzing search terms accumulates.

In this illustrative embodiment, lexical analyzer 1010 analyzes semantic alternatives for the search term if the determined relevance is below a predetermined threshold, e.g., 0.25. In such cases, lexical analyzer 1010 determines the relevance score of each synonym of the search term and adds the relevance score, weighted by 1.0, to the previously determined weighted average relevance score. If the new relevance score is at least the predetermined threshold, relevance analysis stops. Conversely, additional synonyms are analyzed in the same manner.

If all synonyms are exhausted and the cumulative relevance score is still below the predetermined threshold, lexical analyzer 1010 adds weighted relevance scores of hyponyms of the search term to the cumulative relevance score in the same manner. A hyponym of a given word is a more specific version of the word. The relation of a term to a hyponym of the term is that of set to subset. For example, "car" is a hyponym of "vehicle."

If all hyponyms are exhausted and the cumulative relevance score is still below the predetermined threshold, lexical analyzer 1010 adds weighted relevance scores of meronyms of the search term to the cumulative relevance score in the same manner. A meronym of a given word is a word that described a part or portion of the given word. The relation of a term to a meronym of the term is that of whole to part. For example, "engine" and "tire" are meronyms of "car."

If all meronyms are exhausted and the cumulative relevance score is still below the predetermined threshold, lexical analyzer 1010 adds weighted relevance scores of related terms of the search term to the cumulative relevance score in the same manner. A related term is a much more subjective notion and generally connotes a common context. For example, a user interested in the term "pregnancy" is possibly also interested in the term "baby" since the two terms share a context—e.g., procreation.

Once all related terms of the search term have been analyzed, the resulting cumulative relevance score is considered final regardless of the relation of the cumulative relevance score to the predetermined threshold.

Page classifier 1016 determines a probability that the web page referenced by the URL of the subject search listing includes sexual content and/or gambling content. Probability scores for sexual and gambling content are maintained independently. Page classifier uses a probability-based, machine-learning, text classifier 1018 for such analysis. In this illustrative embodiment, text classifier 1018 is the known and conventional Rainbow program.

Algorithmic diagnostic tool 524 returns the probability values determined by page classifier 1016 and permits relevance manager 520 (FIG. 5) to set a threshold at which a web page is deemed to have sexual or gambling content. Page classifier 1016 (FIG. 10) sets a low-confidence flag for the subject search listing if the referenced web page includes media-rich content such as sound, video, and/or images which are particularly difficult to analyze automatically.

In this illustrative embodiment, algorithmic diagnostic tool 524 is multithreaded such that various types of analysis of various search listings and associated web pages takes place concurrently.

The above description is illustrative only and is not limiting. The present invention is defined solely by the claims which follow and their full range of equivalents.

What is claimed is:

1. A computer implemented method for evaluating fitness of a data item for inclusion in a network-accessible database, the method comprising:
   determining a likelihood that the data item comports with a predetermined content policy;
   comparing the likelihood to a predetermined threshold; and
   upon a condition in which the likelihood is below the predetermined threshold,
   including the data item in the network-accessible database without human review of the data item.

2. The method of claim 1 wherein the data item is a search listing and the network-accessible database includes a computerized network search engine database.

3. The method of claim 1 wherein the network-accessible database is accessible through a hypertext transport protocol.

4. The method of claim 1 wherein the network-accessible database is accessible through the Internet.

5. The method of claim 1 wherein the data item includes textual content.

6. The method of claim 1 wherein the data item is a computerized document.

7. The method of claim 1 wherein the data item is a computerized document comporting with a hypertext markup language.

8. The method of claim 1 further comprising:
   upon a condition in which the likelihood is at least the predetermined threshold,
   requiring human review of the data item to determine whether the data item comports with the predetermined content policy.

9. The method of claim 8 wherein the predetermined content policy prohibits one or more blocked terms; and further wherein the likelihood is at least the predetermined threshold upon a determination that the data item includes data representing at least one of the blocked terms.

10. The method of claim 9 wherein the data item is further determined to be unfit for inclusion in the network-accessible database upon a determination that the data item includes data representing at least one of the blocked terms.

11. The method of claim 8 wherein the predetermined content policy requires human review of suspect content which is identified by one or more suspect terms; and further wherein the likelihood is at least the predetermined threshold upon a determination that the data item includes data representing at least one of the suspect terms, thereby requiring human review of the data item.

12. The method of claim 8 wherein determining comprises determining whether the data item includes data representing one or more predetermined sexual terms; and further wherein the likelihood is at least the predetermined threshold upon determination that the data item includes data representing at least one of the predetermined sexual terms.

13. The method of claim 8 wherein determining comprises determining whether the data item includes data representing one or more predetermined gambling terms; and further wherein the likelihood is at least the predetermined threshold upon determination that the data item includes data representing at least one of the predetermined gambling terms.

14. The method of claim 1 further comprising:

determining that the data item includes nonsensical text; and rejecting the data item for inclusion in the network-accessible database.

15. The method of claim 1 further comprising:

modifying the data item to comport with the predetermined content policy;

wherein determining comprises determining the likelihood that the data item as modified comports with the predetermined content policy.

16. The method of claim 1 further comprising:

predicting a frequency of access of the data item;

comparing the predicted frequency of access to a predetermined threshold access frequency;

upon a condition in which the predicted frequency is at least the predetermined threshold, requiring human review of the data item to determine whether the data item comports with the predetermined content policy regardless of the likelihood that the data item comports with the predetermined content policy.

17. A computer implemented method for evaluating fitness of a data item for inclusion in a network-accessible database, the method comprising:

determining a likelihood that the data item comports with a predetermined content policy;

comparing the likelihood to a predetermined threshold; and upon a condition in which the likelihood is at least the predetermined threshold, requiring human review of the data item to determine whether the data item comports with the predetermined content policy.

18. The method of claim 17 wherein the predetermined content policy prohibits one or more blocked terms; and further wherein the likelihood is at least the predetermined threshold upon a determination that the data item includes data representing at least one of the blocked terms.

19. The method of claim 18 wherein the data item is further determined to be unfit for inclusion in the network-accessible database upon a determination that the data item includes data representing at least one of the blocked terms.

20. The method of claim 17 wherein the predetermined content policy requires human review of suspect content which is identified by one or more suspect terms; and further wherein the likelihood is at least the predetermined threshold upon a determination that the data item includes data representing at least one of the suspect terms, thereby requiring human review of the data item.

21. The method of claim 17 wherein determining comprises determining whether the data item includes data representing one or more predetermined sexual terms; and further wherein the likelihood is at least the predetermined threshold upon determination that the data item includes data representing at least one of the predetermined sexual terms.

22. The method of claim 17 wherein determining comprises determining whether the data item includes data representing one or more predetermined gambling terms; and further wherein the likelihood is at least the predetermined threshold upon determination that the data item includes data representing at least one of the predetermined gambling terms.

23. A computer implemented method for evaluating fitness of a data item for inclusion in a network-accessible database, the method comprising:

determining that the data item violates a predetermined content policy;

modifying the data item to comport with the predetermined content policy;

determining that the data item as modified is fit for inclusion in the network-accessible database.

24. A computer implemented method for evaluating fitness of a data item for inclusion in a network-accessible database in accordance with a predetermined content policy specifies one or more conditions under which human review of the data item is required for evaluation of fitness of the data item for inclusion in the network-accessible database, the method comprising:

determining that the data item represents one or more violations of the predetermined content policy; routing the data item for human review for evaluation of fitness of the data item for inclusion in the network-accessible database.

25. The method of claim 24 wherein the predetermined content policy requires human review of suspect content which is identified by one or more suspect terms; and further wherein determining comprises determination that the data item includes data representing at least one of the suspect terms, thereby requiring human review of the data item.

26. The method of claim 24 wherein determining comprises determining whether the data item includes data representing one or more predetermined sexual terms; and further wherein determining comprises determination that the data item includes data representing at least one of the predetermined sexual terms.

27. The method of claim 24 wherein determining comprises determining whether the data item includes data representing one or more predetermined gambling terms; and
further wherein determining comprises determination that the data item includes data representing at least one of the predetermined gambling terms.

28. A computer implemented method for evaluating fitness of a data item for inclusion in a network-accessible database in accordance with a predetermined content policy specifies one or more conditions under which the data item is determined to be unfit for inclusion in the network-accessible database, the method comprising:
determining that the data item represents one or more violations of the predetermined content policy; rejecting the data item for inclusion in the network-accessible database.

29. The method of claim 28 wherein the predetermined content policy prohibits blocked content which is identified by one or more blocked terms; and
further wherein determining comprises determination that the data item includes data representing at least one of the blocked terms and rejecting the data item for inclusion in the network-accessible database.

30. The method of claim 28 wherein the predetermined content policy prohibits nonsensical content; and
further wherein determining comprises determination that the data item includes nonsensical content and rejecting the data item for inclusion in the network-accessible database.

31. A computer implemented method for evaluating fitness of a search listing for inclusion in a search engine database, the method comprising:
determining a likelihood that the search listing comports with a predetermined content policy; comparing the likelihood to a predetermined threshold; and upon a condition in which the likelihood is below the predetermined threshold, including the search listing in the network-accessible database without human review of the search listing.

32. The method of claim 31 wherein the search engine database is accessible through the Internet.

33. The method of claim 31 wherein the search listing refers to a document which includes textual content.

34. The method of claim 31 wherein the search listing refers to a computerized document.

35. The method of claim 31 wherein the search listing refers to a computerized document comporting with a hypertext markup language.

36. The method of claim 31 further comprising:
upon a condition in which the likelihood is at least the predetermined threshold,
requiring human review of the search listing to determine whether the search listing comports with the predetermined content policy.

37. The method of claim 36 wherein the predetermined content policy prohibits one or more blocked terms; and
further wherein the likelihood is at least the predetermined threshold upon a determination that the search listing includes data representing at least one of the blocked terms.

38. The method of claim 37 wherein the search listing is further determined to be unfit for inclusion in the network-accessible database upon a determination that the search listing includes data representing at least one of the blocked terms.

39. The method of claim 36 wherein the predetermined content policy prohibits one or more blocked terms; and
further wherein the likelihood is at least the predetermined threshold upon a determination that the search listing references a document which includes data representing at least one of the blocked terms.

40. The method of claim 39 wherein the search listing is further determined to be unfit for inclusion in the network-accessible database upon a determination that the search listing references a document which includes data representing at least one of the blocked terms.

41. The method of claim 36 wherein the predetermined content policy requires human review of suspect content which is identified by one or more suspect terms; and
further wherein the likelihood is at least the predetermined threshold upon a determination that the search listing includes data representing at least one of the suspect terms, thereby requiring human review of the search listing.

42. The method of claim 36 wherein the predetermined content policy requires human review of suspect content which is identified by one or more suspect terms; and
further wherein the likelihood is at least the predetermined threshold upon a determination that the search listing references a document which includes data representing at least one of the suspect terms, thereby requiring human review of the search listing.

43. The method of claim 36 wherein determining comprises determining whether the search listing includes data representing one or more predetermined sexual terms; and
further wherein the likelihood is at least the predetermined threshold upon determination that the search listing includes data representing at least one of the predetermined sexual terms.

44. The method of claim 36 wherein determining comprises determining whether the search listing includes data representing one or more predetermined sexual terms; and
further wherein the likelihood is at least the predetermined threshold upon determination that the search listing references a document which includes data representing at least one of the predetermined sexual terms.

45. The method of claim 36 wherein determining comprises determining whether the search listing includes data representing one or more predetermined gambling terms; and
further wherein the likelihood is at least the predetermined threshold upon determination that the search listing includes data representing at least one of the predetermined gambling terms.

46. The method of claim 36 wherein determining comprises determining whether the search listing includes data representing one or more predetermined gambling terms; and
further wherein the likelihood is at least the predetermined threshold upon determination that the search listing references a document which includes data representing at least one of the predetermined gambling terms.

47. The method of claim 31 further comprising:
determining that the search listing includes nonsensical text; and
rejecting the search listing for inclusion in the search engine database.

48. The method of claim 31 further comprising:
modifying the search listing to comport with the predetermined content policy;

wherein determining comprises determining the likelihood that the search listing as modified comports with the predetermined content policy.

49. The method of claim 31 further comprising:
predicting a frequency of access of the search listing;
comparing the predicted frequency of access to a predetermined threshold access frequency;
upon a condition in which the predicted frequency is at least the predetermined threshold, requiring human review of the search listing to determine whether the search listing comports with the predetermined content policy regardless of the likelihood that the search listing comports with the predetermined content policy.

50. A computer implemented method for evaluating fitness of a search listing for inclusion in a search engine database, the method comprising:
determining a likelihood that the search listing comports with a predetermined content policy; comparing the likelihood to a predetermined threshold; and upon a condition in which the likelihood is at least the predetermined threshold, requiring human review of the search listing to determine whether the search listing comports with the predetermined content policy.

51. The method of claim 50 wherein the predetermined content policy prohibits one or more blocked terms; and
further wherein the likelihood is at least the predetermined threshold upon a determination that the data item includes data representing at least one of the blocked terms.

52. The method of claim 51 wherein the search listing is further determined to be unfit for inclusion in the search engine database upon a determination that the search listing includes data representing at least one of the blocked terms.

53. The method of claim 50 wherein the predetermined content policy requires human review of suspect content which is identified by one or more suspect terms; and
further wherein the likelihood is at least the predetermined threshold upon a determination that the search listing includes data representing at least one of the suspect terms, thereby requiring human review of the search listing.

54. The method of claim 50 wherein determining comprises determining whether the data item includes data representing one or more predetermined sexual terms; and
further wherein the likelihood is at least the predetermined threshold upon determination that the data item includes data representing at least one of the predetermined sexual terms.

55. The method of claim 54 wherein a degree of relevance of the search listing is determined using term frequency and inverse document frequency.

56. The method of claim 50 wherein determining comprises determining whether the search listing includes data representing one or more predetermined gambling terms; and
further wherein the likelihood is at least the predetermined threshold upon determination that the search listing includes data representing at least one of the predetermined gambling terms.

57. A computer implemented method for evaluating fitness of a search listing for inclusion in a search engine database, the method comprising:
determining that the search listing violates a predetermined content policy;
modifying the search listing to comport with the predetermined content policy; determining that the search listing as modified is fit for inclusion in the search engine database.

58. A computer implemented method for evaluating fitness of a search listing for inclusion in a search engine database in accordance with a predetermined content policy specifies one or more conditions under with human review of the search listing is required for evaluation of fitness of the search listing for inclusion in the search engine database, the method comprising:
determining that the search listing represents one or more violations of the predetermined content policy; routing the search listing for human review for evaluation of fitness of the search listing for inclusion in the search engine database.

59. The method of claim 58 wherein the predetermined content policy requires human review of suspect content which is identified by one or more suspect terms; and
further wherein determining comprises determination that the search listing includes data representing at least one of the suspect terms, thereby requiring human review of the search listing.

60. The method of claim 58 wherein determining comprises determining whether the search listing includes data representing one or more predetermined sexual terms; and
further wherein determining comprises determination that the search listing includes data representing at least one of the predetermined sexual terms.

61. The method of claim 58 wherein determining comprises determining whether the search listing includes data representing one or more predetermined gambling terms; and
further wherein determining comprises determination that the search listing includes data representing at least one of the predetermined gambling terms.

62. The method of claim 58 wherein the content policy specifies a predetermined requisite degree of relevance of the search listing.

63. The method of claim 62 wherein the search listing includes a search term and a title; and
further wherein the search listing has a relevance which is determined at least in part by a degree of relevance between the search term and the title.

64. The method of claim 62 wherein the search listing includes a search term and a description; and
further wherein the search listing has a relevance which is determined at least in part by a degree of relevance between the search term and the description.

65. The method of claim 62 wherein the search listing includes a search term and refers to a document; and
further wherein the search listing has a relevance which is determined at least in part by a degree of relevance between the search term and the document.

66. The method of claim 62 wherein the search listing includes a title and a description; and
further wherein the search listing has a relevance which is determined at least in part by a degree of relevance between the title and the description.

67. The method of claim 62 wherein the search listing includes a title and refers to a document; and
further wherein the search listing has a relevance which is determined at least in part by a degree of relevance between the title and the document.

68. The method of claim 62 wherein the search listing includes a description and refers to a document; and further wherein the search listing has a relevance which is determined at least in part by a degree of relevance between the description and the document.

69. The method of claim 62 wherein the search listing includes a search term which at least partially defines a degree of relevance of the search listing, the method further comprising:
    determining that the degree of relevance of the search listing is below a predetermined threshold relevance; and
    adjusting the degree of relevance of the search listing using a semantic alternative of the search term.

70. The method of claim 69 wherein the semantic alternative is a synonym of the search term.

71. The method of claim 69 wherein the semantic alternative is a hyponym of the search term.

72. The method of claim 69 wherein the semantic alternative is a meronym of the search term.

73. The method of claim 62 further comprising:
    preprocessing the search listing prior to determining a degree of relevance of the search listing.

74. The method of claim 73 wherein preprocessing comprises tokenization of the search listing.

75. The method of claim 73 wherein preprocessing comprises rendering the search listing case-insensitive.

76. The method of claim 73 wherein preprocessing comprises rendering the search listing verb-tense-insensitive.

77. The method of claim 73 wherein preprocessing comprises correcting spelling of content of the search listing.

78. The method of claim 73 wherein preprocessing comprises removal of stop words from the search listing.

79. A computer implemented method for evaluating fitness of a search listing for inclusion in a search listing database in accordance with a predetermined content policy specifies one or more conditions under which the search listing is determined to be unfit for inclusion in the search engine database, the method comprising:
    determined that the search listing represents one or more violations of the predetermined content policy; rejecting the search listing for inclusion in the network-accessible database.

80. The method of claim 79 wherein the predetermined content policy prohibits blocked content which is identified by one or more blocked terms; and
    further wherein determining comprises determination that the search listing includes data representing at least one of the blocked terms and rejecting the search listing for inclusion in the search engine database.

81. The method of claim 79 wherein the predetermined content policy prohibits nonsensical content; and
    further wherein determining comprises determination that the search listing includes nonsensical content and rejecting the search listing for inclusion in the search engine database.

* * * * *